(12) United States Patent
Morita

(10) Patent No.: US 12,406,691 B2
(45) Date of Patent: Sep. 2, 2025

(54) MAGNETIC HEAD, SERVO PATTERN RECORDING APPARATUS, TAPE DRIVE DEVICE, METHOD OF PRODUCING A MAGNETIC TAPE, AND RECORDING METHOD

(71) Applicant: Sony Group Corporation, Tokyo (JP)

(72) Inventor: Hiroshi Morita, Tokyo (JP)

(73) Assignee: Sony Group Corporation, Tokyo (JP)

( * ) Notice: Subject to any disclaimer, the term of this patent is extended or adjusted under 35 U.S.C. 154(b) by 7 days.

(21) Appl. No.: 18/284,691

(22) PCT Filed: Mar. 31, 2022

(86) PCT No.: PCT/JP2022/016638
§ 371 (c)(1),
(2) Date: Sep. 28, 2023

(87) PCT Pub. No.: WO2022/211049
PCT Pub. Date: Oct. 6, 2022

(65) Prior Publication Data
US 2024/0185883 A1 Jun. 6, 2024

(30) Foreign Application Priority Data
Mar. 31, 2021 (JP) .................. 2021-062474

(51) Int. Cl.
*G11B 5/584* (2006.01)
*G11B 5/48* (2006.01)
(52) U.S. Cl.
CPC ............ *G11B 5/584* (2013.01); *G11B 5/4893* (2013.01)

(58) Field of Classification Search
None
See application file for complete search history.

(56) References Cited

U.S. PATENT DOCUMENTS

| | | | |
|---|---|---|---|
| 4,695,909 A | | 9/1987 | Momata et al. |
| 5,220,473 A | * | 6/1993 | Brock ....................... G11B 5/29 360/122 |
| 5,602,703 A | * | 2/1997 | Moore ................... G11B 5/584 |
| 5,678,086 A | * | 10/1997 | Gandola ................ G11B 15/62 |

(Continued)

FOREIGN PATENT DOCUMENTS

| | | | | |
|---|---|---|---|---|
| CN | 118661222 A | * | 9/2024 | |
| JP | S60103510 A | * | 6/1985 | ............. G11B 15/64 |

(Continued)

OTHER PUBLICATIONS

International Search Report from corresponding PCT application PCT/JP2022/016638, dated Apr. 26, 2022.

*Primary Examiner* — William J Klimowicz
(74) *Attorney, Agent, or Firm* — K&L Gates LLP

(57) ABSTRACT

A magnetic head according to an embodiment of the present technology includes: a recording surface that has a first region corresponding to a position where a magnetic gap is provided in a length direction, and a second region corresponding to a position where the magnetic gap is not provided in the length direction, a plurality of groove portions crossing from one end in a width direction orthogonal to the length direction to the other end in the width direction being provided in the second region, and records a signal on a magnetic tape with the magnetic gap.

11 Claims, 16 Drawing Sheets

(56) References Cited

U.S. PATENT DOCUMENTS

| | | | |
|---|---|---|---|
| 5,689,384 A * | 11/1997 | Albrecht | G11B 5/584 |
| 5,751,527 A * | 5/1998 | Sundaram | G11B 5/265 |
| | | | 360/122 |
| 5,774,306 A * | 6/1998 | Wang | G11B 5/10 |
| 5,953,184 A * | 9/1999 | Barber | G11B 5/29 |
| 5,963,401 A * | 10/1999 | Dee | G11B 5/3948 |
| 6,040,964 A * | 3/2000 | Saliba | G11B 5/255 |
| 6,282,055 B1 * | 8/2001 | Lakshmikumaran | G11B 5/10 |
| | | | 360/122 |
| 6,426,848 B1 | 7/2002 | Tamura et al. | |
| 8,144,424 B2 * | 3/2012 | Dugas | G11B 5/265 |
| | | | 360/119.01 |
| 8,416,525 B2 * | 4/2013 | Schwarz | G11B 5/584 |
| | | | 360/77.12 |
| 10,657,989 B1 * | 5/2020 | Biskeborn | G11B 5/187 |
| 11,195,550 B2 * | 12/2021 | Morita | G11B 5/00826 |
| 2004/0240113 A1 * | 12/2004 | Johnson | G11B 5/265 |
| 2005/0254170 A1 * | 11/2005 | Dugas | G11B 5/3163 |
| 2009/0262456 A1 * | 10/2009 | Dugas | G11B 5/29 |
| | | | 360/110 |
| 2012/0008234 A1 * | 1/2012 | Biskeborn | G11B 5/1871 |
| 2014/0268414 A1 | 9/2014 | Nakashio et al. | |
| 2019/0287555 A1 * | 9/2019 | Biskeborn | G11B 5/60 |
| 2021/0280211 A1 * | 9/2021 | Morita | G11B 5/00826 |
| 2024/0404553 A1 * | 12/2024 | Morita | G11B 5/00826 |

FOREIGN PATENT DOCUMENTS

| | | | |
|---|---|---|---|
| JP | H01158607 A | 6/1989 | |
| JP | H1040522 A * | 2/1998 | G11B 5/584 |
| JP | 2001006109 A | 1/2001 | |
| JP | 2014199706 A | 10/2014 | |
| WO | WO-0051109 A1 * | 8/2000 | G11B 5/23 |
| WO | 2020110702 A1 | 6/2020 | |
| WO | WO-2023037585 A1 * | 3/2023 | G11B 5/00813 |

\* cited by examiner

Dummy 70a 23
24

Dummy 70b 23
24

MAGNETIC HEAD, SERVO PATTERN RECORDING APPARATUS, TAPE DRIVE DEVICE, METHOD OF PRODUCING A MAGNETIC TAPE, AND RECORDING METHOD

TECHNICAL FIELD

The present technology relates to a technology such as a servo write head that records a servo pattern on a magnetic tape.

BACKGROUND ART

In recent years, magnetic tapes have been widely used for applications such as backing up electronic data. Since the magnetic tapes have a large capacity and can be preserved for a long period of time, they are attracting more and more attention as a storage medium for big data or the like.

In the magnetic tape, a plurality of data band including a plurality of recording tracks and a plurality of servo bands including a plurality of striped servo patterns are provided. In producing the magnetic tape, first, the servo pattern is recorded on the servo band by a servo write head of a servo pattern recording apparatus (see, for example, Patent Literature 1).

After that, a head unit of a data recording/reproduction apparatus reads the servo pattern in the servo band, and alignment with respect to the recording track in the data band is performed to record data on the recording track.

In recent years, the number of recording tracks tends to significantly increase due to the demand for high-density recording on the magnetic tape. For example, the number of recording tracks of the magnetic tape of the LTO (Linear Tape Open) standard was 384 in the first-generation LTO-1 and increased to 512, 704, 896, 1280, 2176, 3584, and 6656 in the LTO-2 to LTO8, respectively.

CITATION LIST

Patent Literature

Patent Literature 1: Japanese Patent Application Laid-open No. 2014-199706

DISCLOSURE OF INVENTION

Technical Problem

The alignment with respect to the recording track is performed on the basis of the servo pattern, it is necessary to improve, as the number of recording tracks increases, the recording accuracy of the servo pattern accordingly. Meanwhile, the recording accuracy of the servo pattern is lowered due to friction between the servo write head and the magnetic tape in some cases.

In view of the circumstances as described above, it is an object of the present technology to provide a technology such as a servo write head capable of improving the recording accuracy of a servo pattern.

Solution to Problem

A magnetic head according to an embodiment of the present technology includes: a recording surface that has a first region corresponding to a position where a magnetic gap is provided in a length direction and a second region corresponding to a position where the magnetic gap is not provided in the length direction, a plurality of groove portions crossing from one end in a width direction orthogonal to the length direction to the other end in the width direction being provided in the second region, and records a signal on a magnetic tape with the magnetic gap.

MODE (S) FOR CARRYING OUT THE INVENTION

Hereinafter, an embodiment according to the present technology will be described with reference to the drawings.

First Embodiment

In this embodiment, an example of application to a servo write head that records a servo pattern on a magnetic tape will be described as a magnetic head.

[Magnetic Tape]

Figure 1:
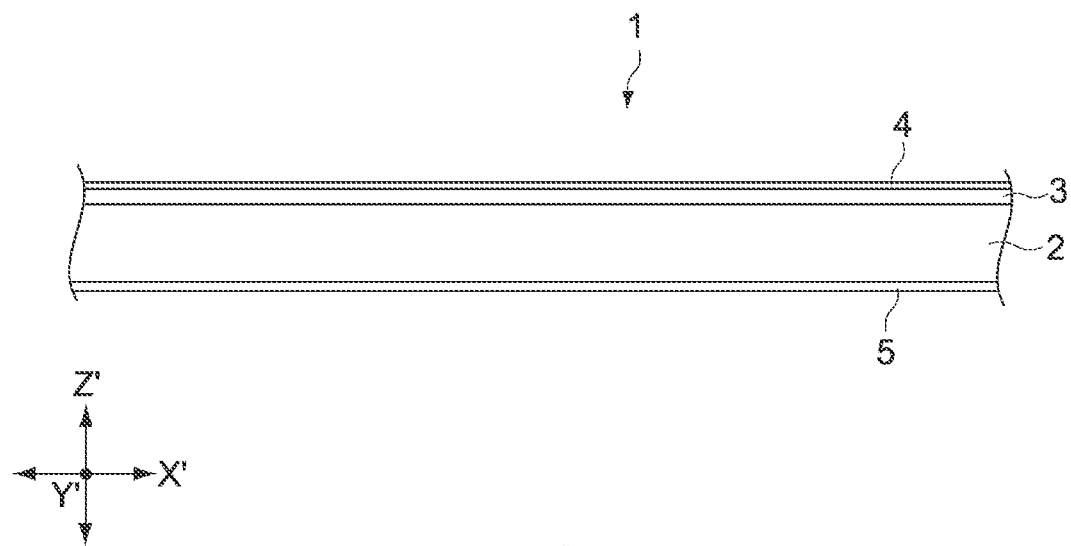
FIG. 1 is a schematic diagram of a magnetic tape when viewed from the side.
Figure 2:
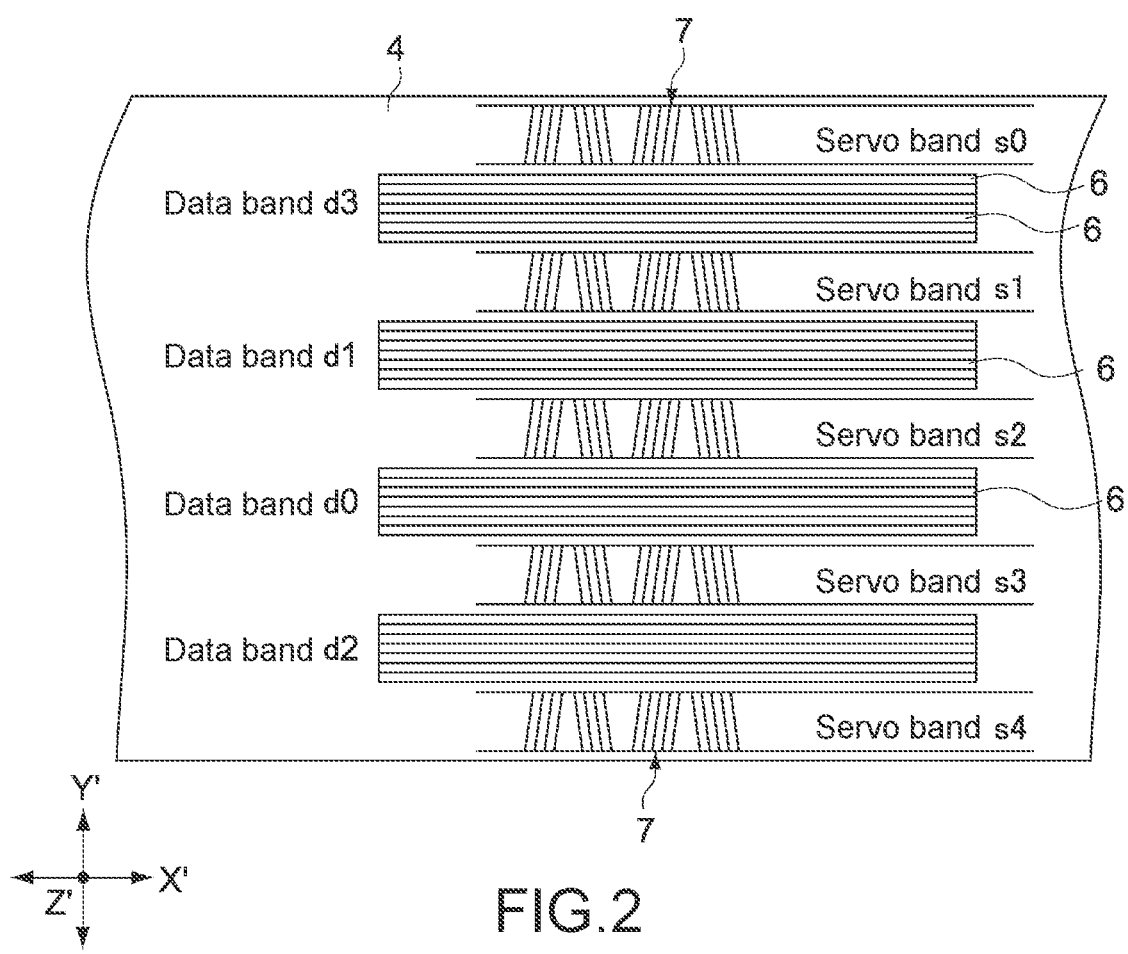
FIG. 2 is a schematic diagram of the magnetic tape when viewed from above.

First, a basic configuration of a magnetic tape 1 according to an embodiment of the present technology will be described. FIG. 1 is a schematic diagram of the magnetic tape 1 when viewed from the side, and FIG. 2 is a schematic diagram of the magnetic tape 1 when viewed from above. Note that in the drawings, the Cartesian coordinate system with reference to the magnetic tape 1 is represented by the X'Y'Z' coordinate system.

As shown in FIG. 1 and FIG. 2, the magnetic tape 1 has a tape shape that is long in the length direction (X'-axis direction), short in the width direction (Y'-axis direction), and thin in the thickness direction (Z'-axis direction).

The magnetic tape 1 includes a tape-shaped base material 2 that is long in the length direction (X'-axis direction), a non-magnetic layer 3 provided on one main surface of the base material 2, a magnetic layer 4 provided on the non-magnetic layer 3, and a back layer 5 provided on the other main surface of the base material 2. Note that the back layer 5 only needs to be provided as necessary, and this back layer 5 may be omitted.

The base material 2 is a non-magnetic support that supports the non-magnetic layer 3 and the magnetic layer 4. The base material 2 contains, for example, at least one selected from the group consisting of polyesters, polyolefins, cellulose derivatives, vinyl resins, and different polymer resins.

The magnetic layer 4 is a recording layer for recording data. This magnetic layer 4 contains a magnetic powder, a binder, conductive particles, and the like. The magnetic layer 4 may further contain an additive such as a lubricant, an abrasive, and a rust inhibitor as necessary.

The magnetic layer 4 may be perpendicularly oriented or longitudinally oriented. The magnetic powder contained in the magnetic layer 4 includes, for example, nanoparticles containing ε-iron oxide (ε-iron oxide particles), nanoparticles containing hexagonal ferrite (hexagonal ferrite particles), or nanoparticles containing Co-containing spinel ferrite (cobalt ferrite).

The non-magnetic layer 3 contains a non-magnetic powder and a binder. The non-magnetic layer 3 may contain, as necessary, an additive such as conductive particles, a lubricant, a curing agent, and a rust inhibitor.

The back layer 5 contains a non-magnetic powder and a binder. The back layer 5 may contain, as necessary, an additive such as a lubricant, a curing agent, and an antistatic agent.

The upper limit value of the average thickness (average total thickness) of the magnetic tape 1 is, for example, 5.6 μm or less, 5.0 μm or less, 4.4 μm or less, or the like. When the average thickness of the magnetic tape 1 is 5.6 μm or less, the recording capacity in a cartridge 21 can be made higher than that in a general magnetic tape 1.

As shown in FIG. 2, the magnetic layer 4 includes a plurality of data bands d (data bands d0 to d3) that is long in the length direction (X'-axis direction) in which data is written, and a plurality of servo bands s (servo bands s0 to s4) that is long in the length direction in which a servo pattern 7 is written. The servo bands s are located at positions where the respective data bands d are sandwiched in the width direction (Y'-axis direction).

In the example shown in FIG. 2, an example in which the number of data bands d is four and the number of servo bands s is five is shown. Note that the number of data bands d and the number of servo bands s can be appropriately changed.

The data band d includes a plurality of recording tracks 6 that is long in the length direction and aligned in the width direction. Data is recorded in the recording tracks 6 along the recording tracks 6. One bit length in the length direction in the data to be recorded in the data band d is, for example, 48 nm or less. The servo band s includes the servo pattern 7 to be recorded by a servo pattern recording apparatus 100 (see FIG. 3).

Here, in the magnetic tape 1 of the LTO standard, the number of recording tracks increases with each generation and the recording capacity is dramatically improved. For example, the number of recording tracks in the first-generation LTO-1 was 384 and increased to 512, 704, 896, 1280, 2176, 3584, and 6656 in the LTO-2 to LTO8, respectively. Similarly, the data recording capacity was 100 GB (gigabytes) in the LTO-1 and increased to 200 GB, 400 GB, 800 GB, 1.5 TB (terabytes), 2.5 TB, 6.0 TB, and 12 TB in the LTO-2 to LTO-8, respectively.

In this embodiment, the number of recording tracks 6 and the recording capacity are not particularly limited and can be appropriately changed. However, it is advantageous to apply the present technology to, for example, the magnetic tape 1 that has a large number of recording tracks 6 and a larger recording capacity (e.g., 6656 or more, 12 TB or more: LTO8 and subsequent LTOs) and needs to record the servo pattern 7 strictly and accurately.

[Servo Pattern Recording Apparatus]

Figure 3:
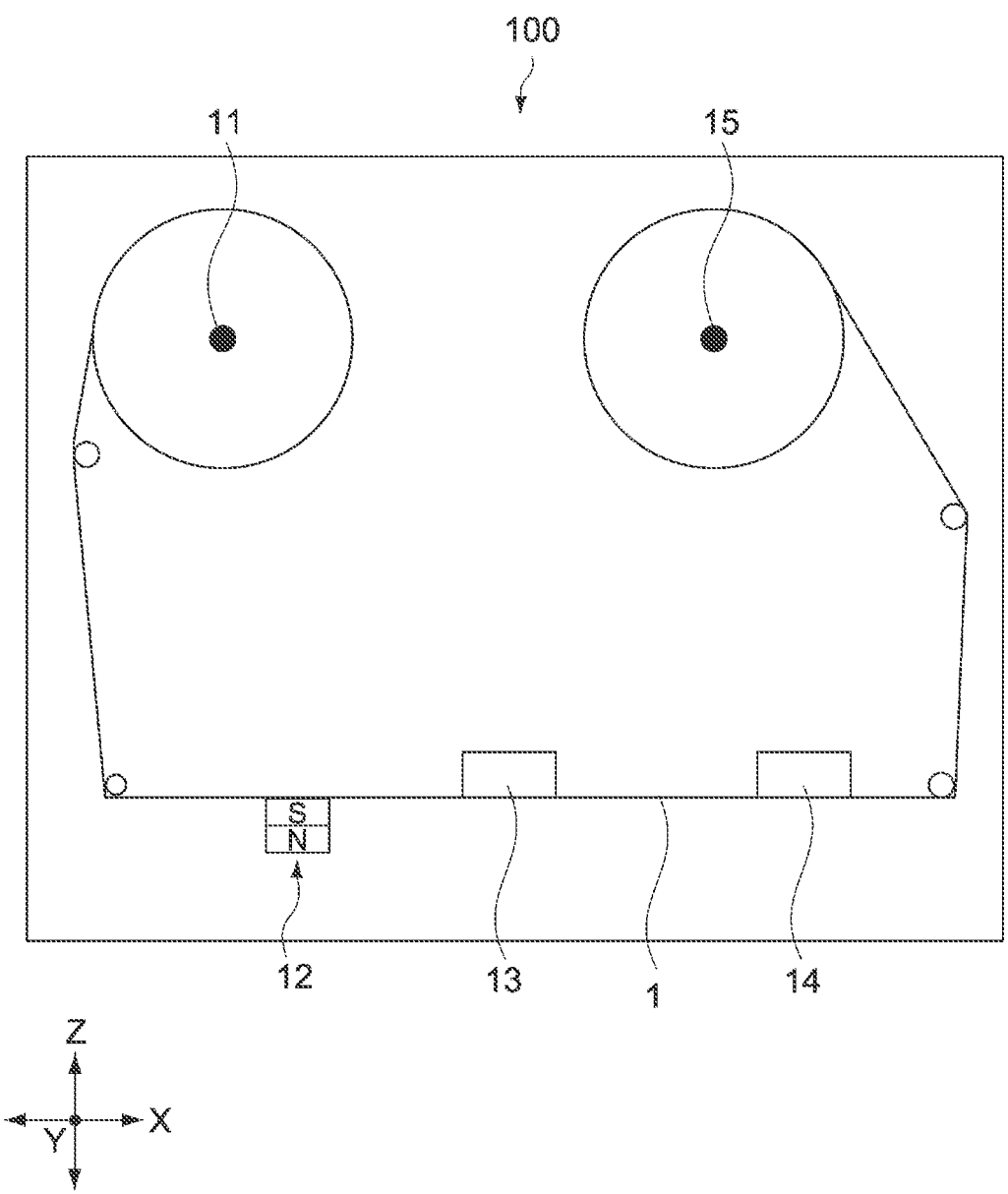
FIG. 3 is a schematic diagram showing a servo pattern recording apparatus.

Next, the servo pattern recording apparatus 100 that records the servo pattern 7 on the servo band s of the magnetic tape 1 will be described. FIG. 3 is a schematic diagram showing the servo pattern recording apparatus 100.

As shown in FIG. 3, the servo pattern recording apparatus 100 includes a feed roller 11, a demagnetizing unit 12, a servo write head 13, a servo read head 14, and a winding roller 15 in this order from the upstream side of the conveying direction of the magnetic tape 1.

The feed roller 11 is capable of rotatably supporting the rolled magnetic tape 1. The feed roller 11 is caused to rotate in accordance with driving of the drive source such as a motor and feeds the magnetic tape 1 toward the downstream side in accordance with the rotation.

The winding roller 15 is capable of rotatably supporting the rolled magnetic tape 1. The winding roller 15 rotates in synchronization with the feed roller 11 in accordance with driving of the drive source such as a motor and winds the magnetic tape 1 in accordance with the rotation.

The feed roller 11 and the winding roller 15 are capable of causing the magnetic tape 1 to move at constant speed on the conveying path.

The servo write head 13 is disposed on the upper side (on the side of the magnetic layer 4) of the magnetic tape 1, for example. The servo write head 13 generates a magnetic field in accordance with a pulse signal of a square wave and applies the magnetic field to part of the magnetic layer 4 of the magnetic tape 1.

In this way, the servo write head 13 magnetizes part of the magnetic layer 4 to record the servo pattern 7 in the magnetic layer 4. The servo write head 13 is capable of recording, when the magnetic tape 1 passes by the lower side of the servo write head 13, the servo pattern 7 in each of the five servo bands s0 to s4.

The demagnetizing unit 12 is disposed on the upstream side of the servo write head 13 and the lower side (the side of the base material 2) of the magnetic tape 1, for example. The demagnetizing unit 12 includes a permanent magnet. The permanent magnet applies, before the servo pattern 7 is recorded by the servo write head 13, a magnetic field to the entire magnetic layer 4 with a DC magnetic field to demagnetize the entire magnetic layer 4.

The servo read head 14 is disposed on the downstream side of the servo write head 13 and the upper side (the side of the magnetic layer 4) of the magnetic tape 1. The servo read head 14 is configured to be capable of reproducing the servo signal by reading the magnetic field generated from the servo pattern 7 recorded on the magnetic tape 1 with an MR element (MR: Magneto Resistive), a GMR element (GMR: Giant Magneto Resistive), a TMR element (TMR: Tunnel Magneto Resistive), an inductive head, or the like. The reproduced waveform of the servo signal read by the servo read head 14 is used to check whether or not the servo pattern 7 has been accurate recorded.

Note that although not shown, the servo pattern recording apparatus 100 includes a control device that integrally controls the respective units of the servo pattern recording apparatus 100.

The control device includes, for example, a control unit, a storage unit, a communication unit, and the like. The control unit includes, for example, a CPU (Central Processing Unit) and the like and integrally controls the respective units of the servo pattern recording apparatus 100 in accordance with a program stored in the storage unit.

The storage unit includes a non-volatile memory on which various types of data and various programs are to be recorded, and a volatile memory used as a work area of the control unit. The various programs described above may be read from a portable recording medium such as an optical disc and a semiconductor memory, or may be downloaded from a server apparatus in a network. The communication unit is configured to be capable of communicating with other apparatuses such as a server apparatus.

Here, in this embodiment, the servo write head 13 is particularly characterized. Before describing this servo write head 13, the basic concept of the present technology will be touched on.

The alignment with respect to the recording track 6 in the data band d is performed on the basis of the servo pattern 7 in the servo band s. Therefore, when the number of recording tracks increases, it is necessary to improve the recording accuracy of the servo pattern 7 accordingly. Regarding the number of recording tracks, it is necessary to prepare 6656 recording tracks 6 in the LTO8. Further, in the LTO9 and subsequent LTOs, it is expected that the number of recording tracks further increases. Therefore, in such a case, it is required to record the servo pattern 7 strictly and accurately (e.g., on the order of nanometer).

Meanwhile, in the case of a general servo write head, the recording accuracy of the servo pattern 7 is lowered due to the friction between the servo write head and the magnetic tape 1 in some cases. When the present inventors actually performed frequency analysis of the reproduced waveform of the servo pattern 7 written by a general servo write head, it was confirmed that there was an error caused by the friction in a specific frequency region.

When the number of recording tracks increases, it is necessary to eliminate such an error due to the friction. For this reason, in this embodiment, by devising the shape and the like of the portion (a facing portion 21 and a recording surface 22 described below) of the servo write head 13, which slides on the magnetic tape 1, the influence of friction is reduced and the recording accuracy of the servo pattern 7 is improved.

Note that it is advantageous to apply the present technology to recording of the servo pattern 7 on the magnetic tape 1 having a large number of recording tracks 6 (e.g., 6656 or more: LTO8 and subsequent LTOs), but it goes without saying that the present technology can be applied to recording of the servo pattern 7 on the magnetic tape 1 having a small number of recording tracks (e.g., less than 6656).

(Servo Write Head)

Figure 4:
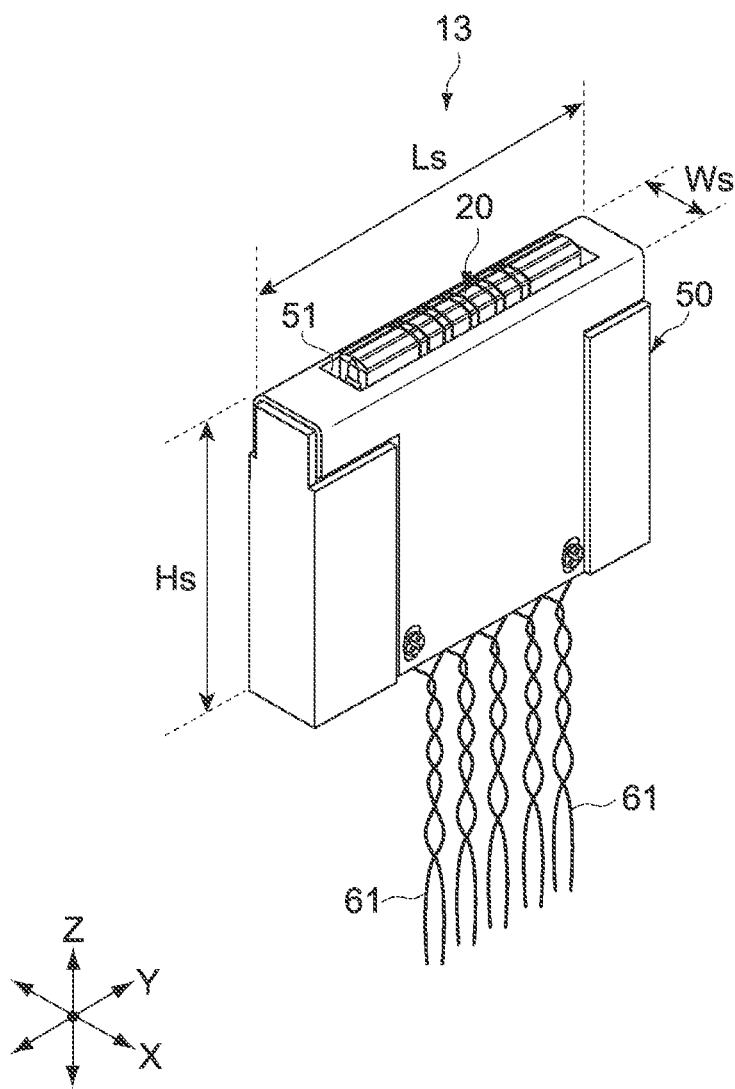
FIG. 4 is a perspective view of a servo write head when viewed from the side of the magnetic tape.
Figure 5:
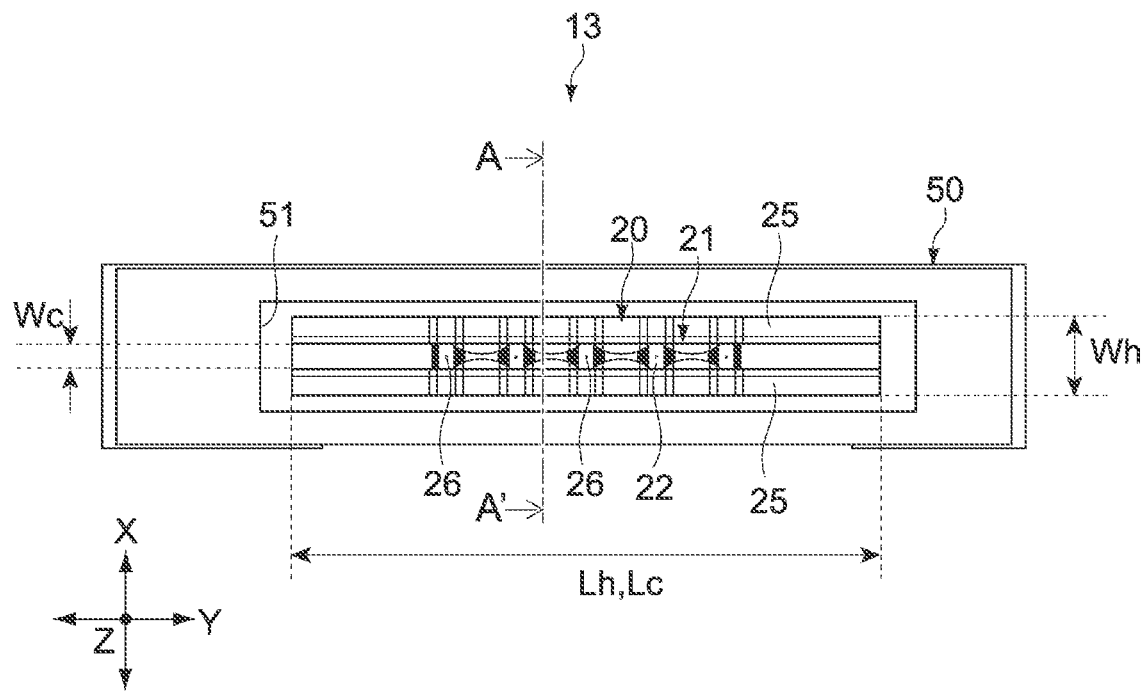
FIG. 5 is a plan view of the servo write head when viewed from the side of the magnetic tape.

Next, a specific configuration of the servo write head 13 will be described. FIG. 4 is a perspective view of the servo write head 13 when viewed from the side of the magnetic tape 1. FIG. 5 is a plan view of the servo write head 13 when viewed from the side of the magnetic tape 1.

Figure 6:
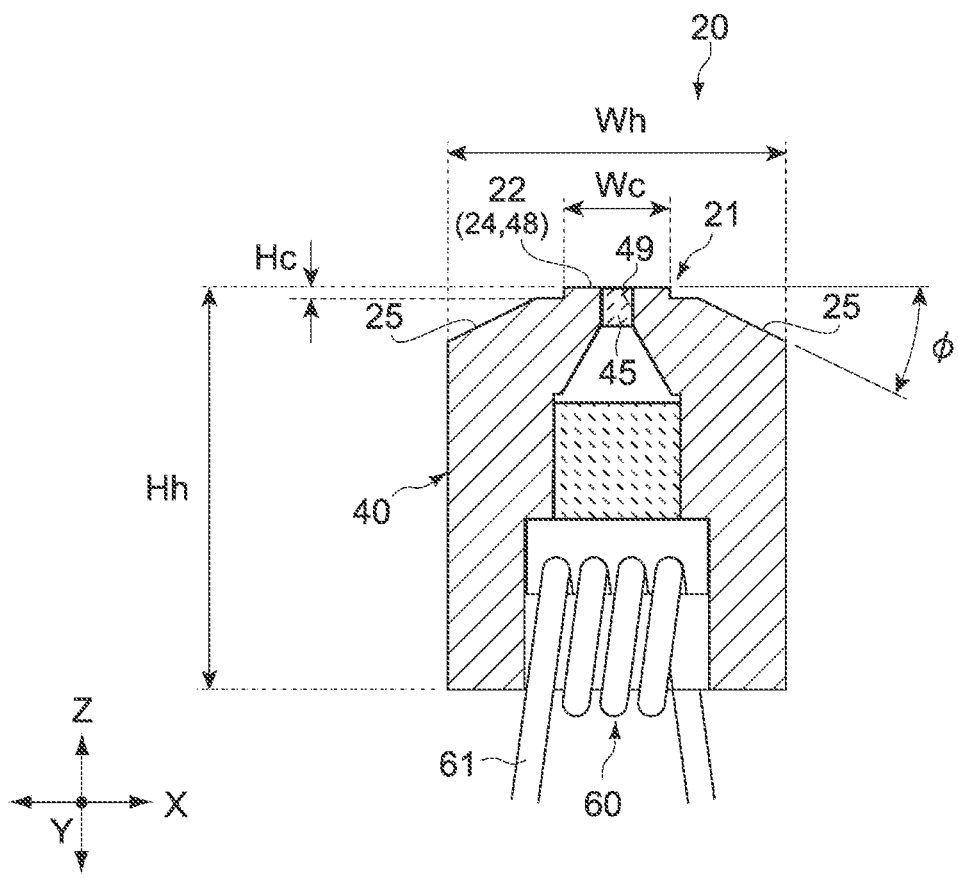
FIG. 6 is a cross-sectional view taken along the line A-A' shown in FIG. 5.
Figure 7:
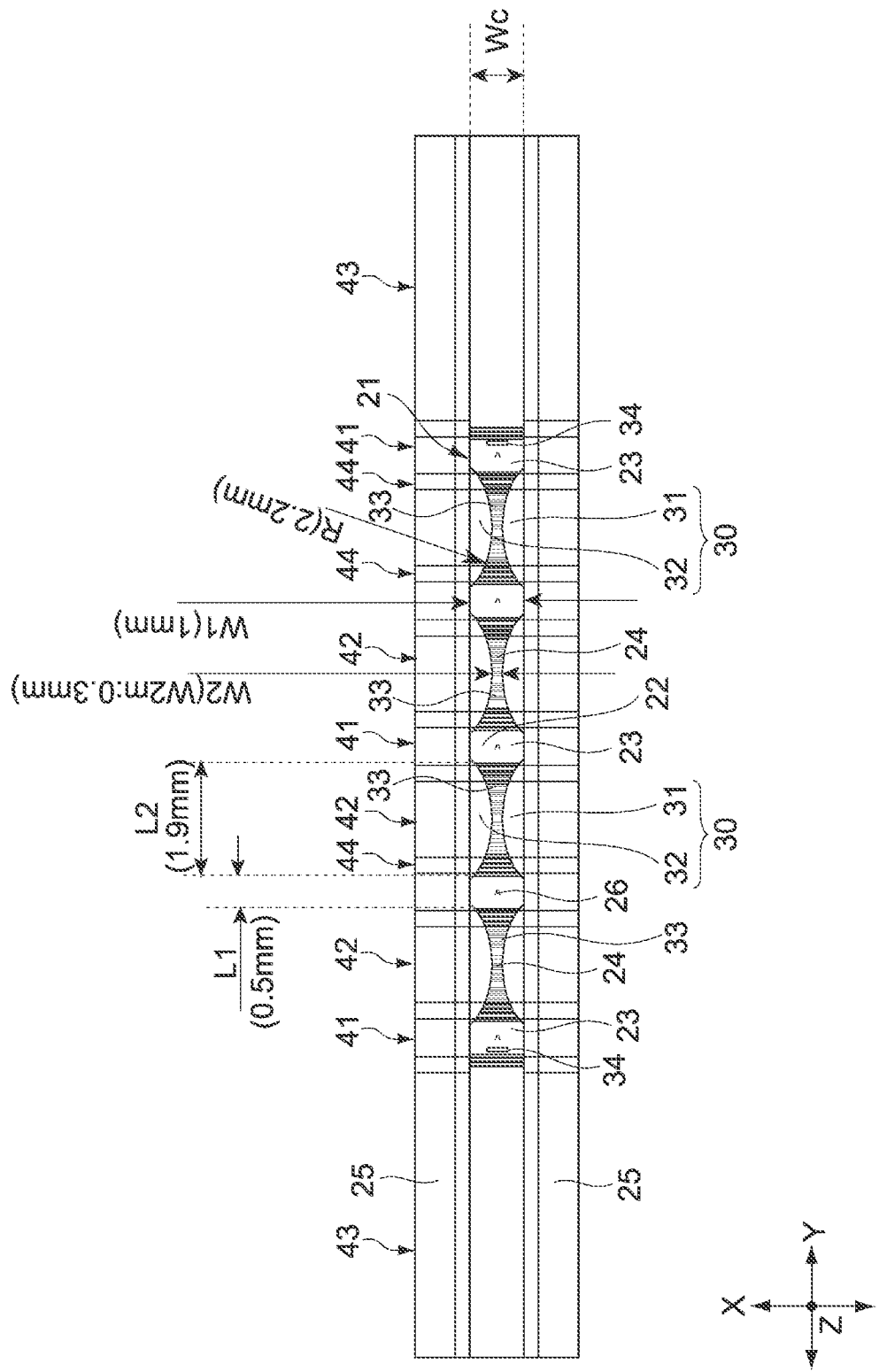
FIG. 7 is a partial enlarged view of the servo write head when viewed from the side of the magnetic tape.
Figure 8:
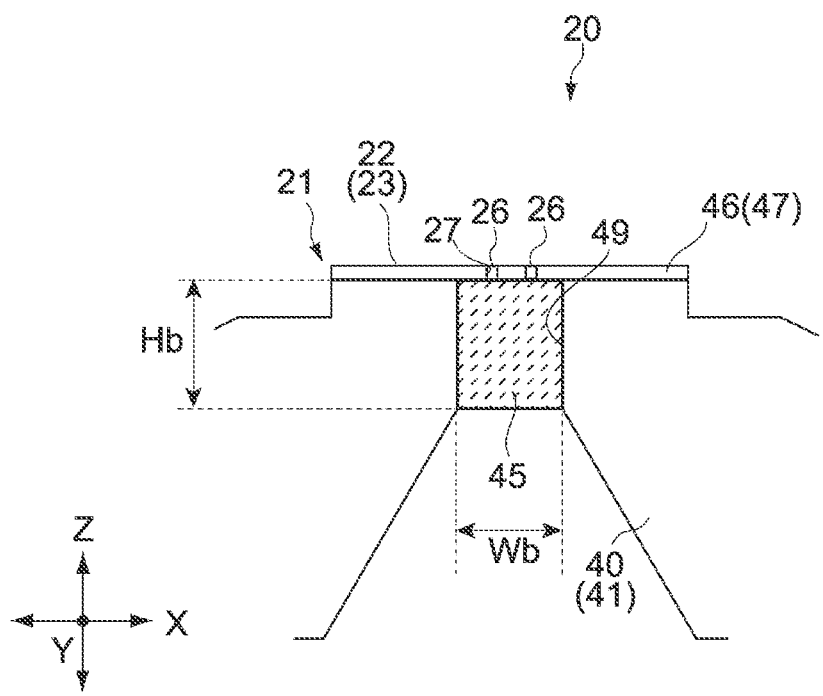
FIG. 8 is a schematic partial enlarged view of the upper part of the servo write head when viewed from the side.
Figure 9:
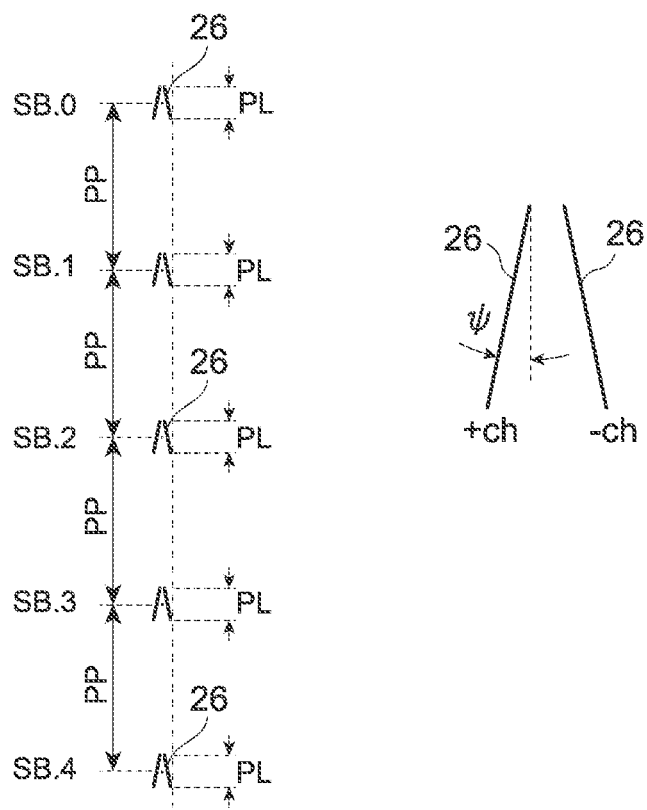
FIG. 9 is a schematic diagram showing a magnetic gap provided in the servo write head.

Further, FIG. 6 is a cross-sectional view taken along the line A-A' in FIG. 5. FIG. 7 is a partial enlarged view of the servo write head 13 when viewed from the side of the magnetic tape 1. FIG. 8 is a schematic partial enlarged view of the upper part of the servo write head 13 when viewed from the side. Further, FIG. 9 is a schematic diagram showing a magnetic gap 26 provided in the servo write head 13.

Note that in the respective drawings described in this specification, the Cartesian coordinate system with reference to the servo write head 13 (a head block 20 and a dummy 70) is represented by an XYZ coordinate system.

In the servo write head 13, the length direction (Y-axis direction) corresponds to the width direction (Y'-axis direction) of the magnetic tape 1, and the width direction (X-axis direction) corresponds to the length direction (X'-axis direction) of the magnetic tape 1 and the travelling direction of the magnetic tape 1. Further, in the servo write head 13, the height direction (Z-axis direction) corresponds to the thickness direction (Z'-axis direction) of the magnetic tape 1.

As shown in these figures, the servo write head 13 includes a head block 20, a shield case 50, and a plurality of coils 60.

The shield case 50 shields the magnetic field generated from the coil 60 such that the magnetic field generated from the coil 60 included in the servo write head 13 does not adversely affect other external parts. Further, the shield case 50 shields the magnetic field generated from the outside such that the magnetic field generated from other external parts does not adversely affect the coil 60.

The shield case 50 has a hollow rectangular parallelepiped shape that is long in the length direction (Y-axis direction), short in the width direction (X-axis direction), and high in the height direction (Z-axis direction) (see, particularly, FIG. 4 and FIG. 5). In this embodiment, the shield case 50 has a length Ls (Y-axis direction) of 38 mm, a width Ws (X-axis direction) of 6.4 mm, and a height Hs (Z-axis direction) of 30 mm. Note that the specific dimensions of each member, the number of members, and the like mentioned in this specification are merely examples, and can be appropriately changed.

An opening 51 for exposing the head block 20 from the shield case 50 is provided in the upper part of the shield case 50. Further, in the lower part of the shield case 50, an opening for drawing out a lead wire 61 connected to the coil 60 to the outside of the shield case 50 is provided.

The head block 20 is formed to be long in the length direction (Y-axis direction) and is formed to have an inverted U shape (partially cylindrical shape) with a curved upper part (on the side of the magnetic tape 1) when viewed from the length direction (see, particularly, FIG. 5 to FIG. 7). In this embodiment, the head block 20 has a length Lh (Y-axis direction) of 24 mm, a width Wh (X-axis direction) of 3.2 mm, and a height Hh (Z-axis direction) of 3.8 mm.

In the upper part of the head block 20, a facing portion 21 that faces the magnetic tape 1 is provided along the length direction (Y-axis direction) in the vicinity of the center in the width direction (X-axis direction). This facing portion 21 is provided to the head block 20 so as to protrude one step higher (toward the magnetic tape 1) than the other portions in the upper part of the head block 20.

In this embodiment, the facing portion 21 has a length Lc (Y-axis direction) of 24 mm, a width Wc (X-axis direction) of 1 mm, and a height Hc (Z-axis direction) of 0.1 mm.

Two tapered surfaces 25 inclined in directions opposite to each other with respect to the horizontal place are provided at positions sandwiching the facing portion 21 in the width direction in the upper part of the head block 20. An angle φ at which the tapered surface 25 is inclined with respect to the horizontal plane is 25° in this embodiment.

The surface of the facing portion 21 is a flat surface. In this specification, this surface of the facing portion 21 is referred to as a recording surface 22. This recording surface 22 faces the travelling magnetic tape 1 and records the servo pattern 7 on the magnetic tape 1 by the magnetic gap 26 provided in the recording surface 22.

In this embodiment, in order to reduce the friction between the servo write head 13 and the magnetic tape 1, the shape of the recording surface 22 (shape of the facing portion 21) is made different from the normal shape. In this embodiment, this shape of the recording surface 22 (shape of the facing portion 21) allows the magnetic tape 1 to come into contact with part (first region 23) of the recording surface 22 and allows the magnetic tape 1 not to come into contact with other parts (second region 24) of the recording surface 22.

Note that although the recording surface 22 is a sliding surface that slides against the magnetic tape 1, the magnetic tape 1 is partially separated from the recording surface 22 in this embodiment, and thus, not all of the recording surface 22 is a sliding surface. Further, in the upper part of the head block 20, the portions other than the recording surface 22, e.g., the tapered surface 25, are configured so as not to come into contact with the magnetic tape 1 in order to reduce the friction.

A plurality of sets of magnetic gaps 26 is provided at predetermined intervals in the recording surface 22 along the length direction (Y-axis direction) (see, particularly, FIG. 9). A set of magnetic gaps 26 includes two magnetic gaps 26 ("/" and "\") disposed to be inclined in directions opposite to each other with a predetermined azimuth angle ψ. The azimuth angle ψ is, for example, 12°±3°. Further, the length PL (Y-axis direction) of the magnetic gap 26 is, for example, 96 μm±3 μm, and the gap width (X-axis direction) that is the width of the magnetic gap 26 itself is, for example, 0.9 μm.

The number of sets of the magnetic gaps 26 corresponds to the number of the servo bands s in the magnetic tape 1, and the number of sets of magnetic gaps 26 is five in this embodiment. Further, in the five sets of magnetic gaps 26, an interval PP between two sets of the magnetic gaps 26 adjacent to each other in the length direction (Y-axis direction) corresponds to the interval between two servo bands s adjacent to each other, and this interval PP is, for example, 2858.8 μm±4.6 μm.

In the upper part of the facing portion 21, a notch portion 30 is provided in each of regions (four regions) between the magnetic gaps 26 adjacent to each other in the length direction (see, particularly, FIG. 7). Each of the four sets of notch portions 30 includes two notches, i.e., a first notch 31 and a second notch 32.

The first notch 31 is formed by notching one end side in the width direction (X-axis direction) in the upper part of the facing portion 21. Further, the second notch 32 is formed by notching the other end side in the width direction in the upper part of the facing portion 21. The first notch 31 and the second notch 32 are formed line-symmetrically with respect to the center line in the width direction of the facing portion 21 (recording surface 22).

In this embodiment, the first notch 31 and the second notch 32 are formed to have a circular arc shape. A radius of curvature R of this circular arc is 2.2 mm. Further, the depth of the notch portion 30 is 5 μm to 7 μm.

By forming the notch portion 30 in the upper part of the facing portion 21, the first region 23 and the second region 24 are formed on the recording surface 22. The first region 23 is a region that is formed to have a first width W1 in the width direction (X-axis direction) and corresponds to the position where the magnetic gap 26 is provided in the length direction (Y-axis direction) orthogonal to the width direction. The second region 24 is a region that is formed to have a second width W2 narrower than the first width W1 and corresponds to the position where the magnetic gap 26 is not provided in the length direction. The second region 24 is formed by notching the recording surface 22 to have a predetermined shape in the width direction.

The first region 23 and the second region 24 are alternately arranged along the length direction (Y-axis direction). The number of first regions 23 corresponds to the number of sets of magnetic gaps 26 and is five in this embodiment. Further, the number of second regions 24 is four in this embodiment. Note that although the second region 24 is a region between two sets of magnetic gaps 26 adjacent to each other in this embodiment, the second region 24 may be set further outside the magnetic gap 26 at the end in the length direction (Y-axis direction).

As shown in FIG. 7, a recessed portion 34 is provided in each of two first regions 23 located at both ends in the length direction (Y-axis direction) of the recording surface 22, of the five first regions 23. The recessed portions 34 are each a bottomed recessed portion having a rectangular plane shape with a long side in width direction (X-axis direction) of the recording surface 22, and are located toward both ends in the longitudinal direction of the recording surface 22 than the magnetic gap 26.

In particular, the recessed portion 34 is provided at a position where it is shielded from the outside air by being covered with the area of the magnetic tape 1 on the edge side when the magnetic tape 1 comes into contact with the recording surface 22. As a result, a negative pressure is formed inside the recessed portion 34 during travelling of the magnetic tape 1, and thus, it is possible to maintain the contact state between the edge portion of the magnetic tape 1 and the recording surface 22 by using the pressure difference with the outside air and stably record the servo pattern on the magnetic tape 1 by the magnetic gap 26 adjacent to the recessed portion 34.

The shape of the recessed portion 34 is not limited to the example described above, and the recessed portion 34 may be formed in an arbitrary shape such as a circle and an ellipse. Further, the recessed portion 34 is not necessarily need to be formed alone, and may include an arrangement of a plurality of recessed portions having a slot shape.

The first region 23 of the recording surface 22 includes a pair of magnetic gaps 26 in the center, and has a width W1 (first width: X-axis direction) of 1 mm and a length L1 (Y-axis direction) of 0.5 mm. The width W1 (first width) of the first region 23 is the same as the width Wc of the facing portion 21.

The length L1 of the first region 23 is determined by setting the length of a margin (+α) with respect to the length PL (96 μm±3 μm) of the magnetic gap 26. The length of this margin is, for example, approximately two to ten times the length of the magnetic gap 26. Note that in this embodiment, the length of this margin is approximately four times the length of the magnetic gap 26.

The width (second width W2) of the second region 24 of the recording surface 22 is made narrower than the width (first width W1) of the first region 23 by the notch portion 30. The width (second width W2) of the second region 24 gradually narrows toward the center (length direction) of the second region 24 and is the thinnest in the center thereof because the shape of the notch portion 30 has a circular arc shape. In this embodiment, a width W2m of the thinnest portion in the center of the second region 24 in the length direction is 0.3 mm.

In this embodiment, the width W2m (0.3 mm) corresponding to the portion of the second region 24 having the narrowest width is 0.3 times the width (first width W1: 1 mm) of the first region 23. Note that the radius of curvature R (2.2 mm) of the circular arc is 2.2 times the width (first width W1: 1 mm) of the first region 23.

A length L2 (Y-axis direction) of the second region 24 1.9 mm. The length L2 of the second region 24 is, for example, approximately two to 10 times the length L1 of the first region 23. Note that in this embodiment, this length L2 of the second region 24 is approximately four times the length L1 of the first region 23.

Further, as shown in FIG. 7, a plurality of groove portions 33 is provided in the second region 24. The plurality of groove portions 33 is formed in the second region 24 so as to cross the recording surface 22 from one end of the recording surface 22 in the width direction (X-axis direction) to the other end. In this embodiment, the plurality of groove portions 33 is arranged at intervals in the length direction (Y-axis direction) of the recording surface 22 and is linearly formed in parallel with the width direction (X-axis direction) of the recording surface 22.

As described below, the plurality of groove portions 33 is for increasing the amount of air flowing through the second region 24 to efficiently floating the magnetic tape 1 from the second region 24 during travelling of the magnetic tape 1. For this reason, it is favorable that the width dimension of the plurality of groove portions 33 along the longitudinal direction (Y-axis direction) of the recording surface 22 is larger than the depth dimension thereof.

Figure 10:
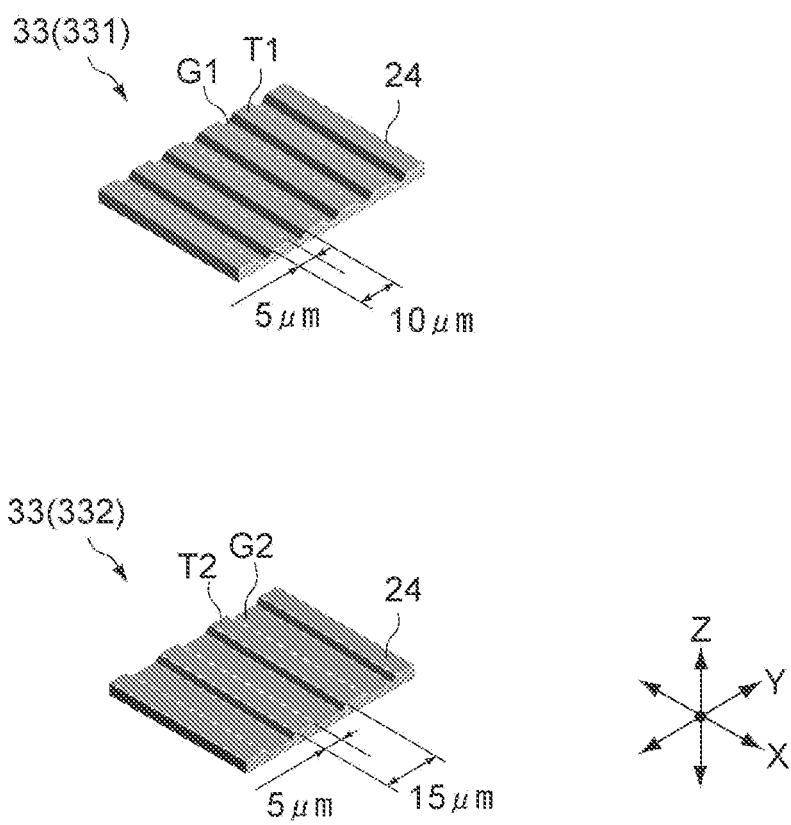
FIG. 10 is a schematic diagram showing a groove portion provided in the servo write head.

FIG. 10 shows a configuration example of the groove portion 33.

In FIG. 10, a groove portion 331 on the upper side is formed square grooves G1 having a flat bottom portion. A flat apex T1 is formed between two square grooves G1 adjacent to each other. In this example, the depth of the square groove G1 is approximately 1 μm, the groove width of the bottom portion of the square groove G1 is approximately 5 μm, the width of the apex T1 is approximately 5 μm, and the arrangement pitch of the square grooves G1 is approximately 10 μm.

Meanwhile, a groove portion 332 on the lower side in FIG. 10 is formed by square grooves G2 having a flat bottom portion. A flat apex T2 is formed between two square grooves G2 adjacent to each other. This example is different from the groove portion 331 in that the width dimension of the bottom portion of the groove portion is larger than the width dimension of the apex. In this example, the depth of the square groove G1 is approximately 1 μm, the groove width of the bottom portion of the square groove G2 is approximately 10 μm, the width of the apex T2 is approximately 5 μm, and the arrangement pitch of the square grooves G2 is approximately 15 μm.

In the servo write head 13 according to this embodiment, the groove portion 332 according to the configuration example on the lower side in FIG. 10 is adopted as the plurality of groove portions 33.

Note that the shape of the groove portion 33 is not limited to the example described above, a groove portion having various cross-sectional shapes such as a V groove and a U groove can be adopted. Further, the arrangement pitch of the groove portions 33 is not necessarily constant. Further, the formation direction of the groove portions 33 may be slightly inclined with respect to the width direction (X-axis direction) of the recording surface 22, or grooves inclined in different directions may be combined. Further, also the depth and width of the groove portion 33 do not necessarily need to be constant.

The plurality of groove portions 33 is typically formed over the entire region of the second region 24. The method of forming the groove portions 33 is not particularly limited. For example, a surface processing technology such as dry etching is used, but a laser processing method, a mechanical processing method, or the like may be used other than this.

The head block 20 includes a core portion 40 that is a core of the head block 20, a base portion 45 that is a base where the magnetic gap 26 is formed, and a thin film portion 46 forming a surface of the facing portion 21 (see, particularly, FIG. 6 and FIG. 8). The thin film portion 46 includes a metal magnetic film 47 (FIG. 8) that is provided at a position corresponding to the first region 23 in the facing portion 21, and a non-magnetic hard film 48 (FIG. 6) that is provided at a position corresponding to the second region 24. Note that the above-mentioned recording surface 22 actually corresponds to surfaces of the metal magnetic film 47 and the non-magnetic hard film 48 (surface of the thin film portion 46).

The core portion 40 is formed to be long in the length direction (Y-axis direction) and is formed to have an inverted U shape (partially cylindrical shape: portion corresponding to a first core 41 described below) with a curved upper part when viewed from the length direction. In this embodiment, the core portion 40 has a length Lh (Y-axis direction) of 24 mm, a width Wh (X-axis direction) of 3.2 mm, and a height Hh (Z-axis direction) of 3.8 mm (same as the above-mentioned dimension of the head block 20).

In the vicinity of the center of the upper part of the core portion 40 in the width direction (X-axis direction), an opening 49 that vertically penetrates the core portion 40 is formed along the length direction (Y-axis direction). The base portion 45 is disposed in the opening 49 so as to fill the opening 49 formed on the upper part of the core portion 40.

The base portion 45 has a shape that is long in the length direction (Y-axis direction) and short in the width direction (X-axis direction) and the thickness direction (Z-axis direction). In this embodiment, the base portion 45 has a length (Y-axis direction) of 24 mm, a width Wb (X-axis direction) of 0.33 mm, and a height Hb (Z-axis direction) of 0.4 mm. Note that the width Wb of the base portion 45 is approximately ⅓ of the width Wc of the facing portion 21.

As the material of the base portion 45, a hard non-magnetic material (various glass materials, various ceramic materials) having a high melting point is used in consideration of various types of bonding during the production of the head block 20 and heat treatment performed for achieving the magnetic properties of the metal magnetic film 47.

The metal magnetic film 47 is provided in a region of the facing portion 21 corresponding to the first region 23 (entire region). The metal magnetic film 47 is formed of, for example, Fe-based microcrystal, NiFe, or another soft magnetic alloy having high saturation magnetic flux density similar thereto. Further, the thickness of the metal magnetic film 47 is several μm.

An opening 27 having a shape corresponding to the magnetic gap 26 is provided in the metal magnetic film 47 at a position corresponding to the magnetic gap 26. This opening 27 is provided in the metal magnetic film 47 so as to vertically penetrate the metal magnetic film 47. A non-magnetic material is embedded in this opening 27. The upper surface of this non-magnetic material has the same height as that of the surface (recording surface 22) of the metal magnetic film 47, and the lower surface of the non-magnetic material is connected to the upper surface of the base portion 45. This non-magnetic material embedded in the metal magnetic film 47 forms the magnetic gap 26.

When the core portion 40 (first core 41) is excited by the coil 60, the non-magnetic material (magnetic gap 26) embedded in the metal magnetic film 47 prevents the magnetic flux from passing through the metal magnetic film 47, and thus, a leakage magnetic field is generated at the position of the magnetic gap 26. This leakage magnetic field makes it possible to write the servo pattern 7 on the servo band s.

The non-magnetic hard film 48 is provided in a region of the facing portion 21 corresponding to the second region 24 (entire region). Further, the non-magnetic hard film 48 is also provided in a region of the facing portion 21 further outside the first region 23 at the end in the length direction (Y-axis direction). The non-magnetic hard film 48 includes, for example, an $SiO_2$ film and is formed to have the same thickness as that of the metal magnetic film 47.

Note that the surface of the metal magnetic film 47 and the surface of the non-magnetic hard film 48 (i.e., the recording surface 22) have the same height, and these surfaces are flat surfaces. The groove portion 33 is formed by processing the non-magnetic hard film 48. The recessed portion 34 is formed by processing the metal magnetic film 47.

The core portion 40 includes five first cores 41 corresponding to the first region 23, four second cores 42 corresponding to the second region 24, and two end cores 43 located at both ends in the length direction (see, particularly, FIG. 7). Adhesive layers 44 are interposed between two cores 41, 42, and 43 adjacent to each other, and the respective cores 41, 42, and 43 are connected to each other via the adhesive layers 44.

The first core 41 is formed of a magnetic material, while the second core 42 and the end core 43 are each formed of a non-magnetic material. Note that by interposing the second core 42 formed of a non-magnetic material between the first cores 41, it is possible to magnetically separate the individual first cores 41 from each other.

As the magnetic material forming the first core 41, for example, a material such as monocrystalline ferrite and polycrystalline ferrite is used. Examples of the ferrite material include Mn—Zn ferrite.

As the non-magnetic material forming the second core 42 and the end core 43, a material having a coefficient of thermal expansion equivalent to those of the first core 41 and the metal magnetic film 47 is used considering that heat treatment is performed for various types of bonding and for achieving the magnetic properties of the metal magnetic film 47. For example, as the non-magnetic material, $BaO—TiO_2$ ceramics, $Cao-TnO_2$ ceramics, glass ceramics having a coefficient of thermal expansion close to that of a ferrite material, or the like is used.

The second core 42 and the end core 43 are each formed to have an inverted U shape with the lower part opened when viewed from the longitudinal direction (see, particularly, FIG. 6). Meanwhile, the shape of the first core 41 is different from the shapes of the second core 42 and the end core 43 in that the entire first core 41 is formed to have a cylindrical shape (O-shape) whose lower part being not opened although the upper pert thereof has the same shape as those of the second core and the end core 43.

The individual lead wires 61 are wound around in a coil shape on the lower parts of the five first cores 41 to form the individual coils 60.

Individual pulse signals can be supplied to the five coils 60, and the five first cores 41 can be individually excited. As a result, the five first cores 41 are capable of writing the servo pattern 7 on the servo band s at different timings.

Note that the thin film portion 46 forming the surface of the facing portion 21 in the first core 41 is the metal magnetic film 47, while the thin film portion 46 forming the surface of the facing portion 21 in the second core 42 and the end core 43 is the non-magnetic hard film 48.

The servo write head 13 may be movable in the height direction (Z-axis direction) by a head moving mechanism (not shown). In this case, the recording surface 22 of the head block 20 can be made protrude toward the side of the magnetic tape 1, and a penetration distance P to the side of the magnetic tape 1 and the wrap angle θ with respect to the magnetic tape 1 can be adjusted.

[Evaluation of Contact State Between Recording Surface and Magnetic Tape]

Next, evaluation of the contact state between the recording surface 22 and the travelling magnetic tape 1 will be described. In this evaluation, first, a plurality types of dummies 70 imitating the upper part of the head block 20 is prepared. Next, each of these dummies 70 was set in an evaluation apparatus 200 to evaluate the contact state.

Figure 11:
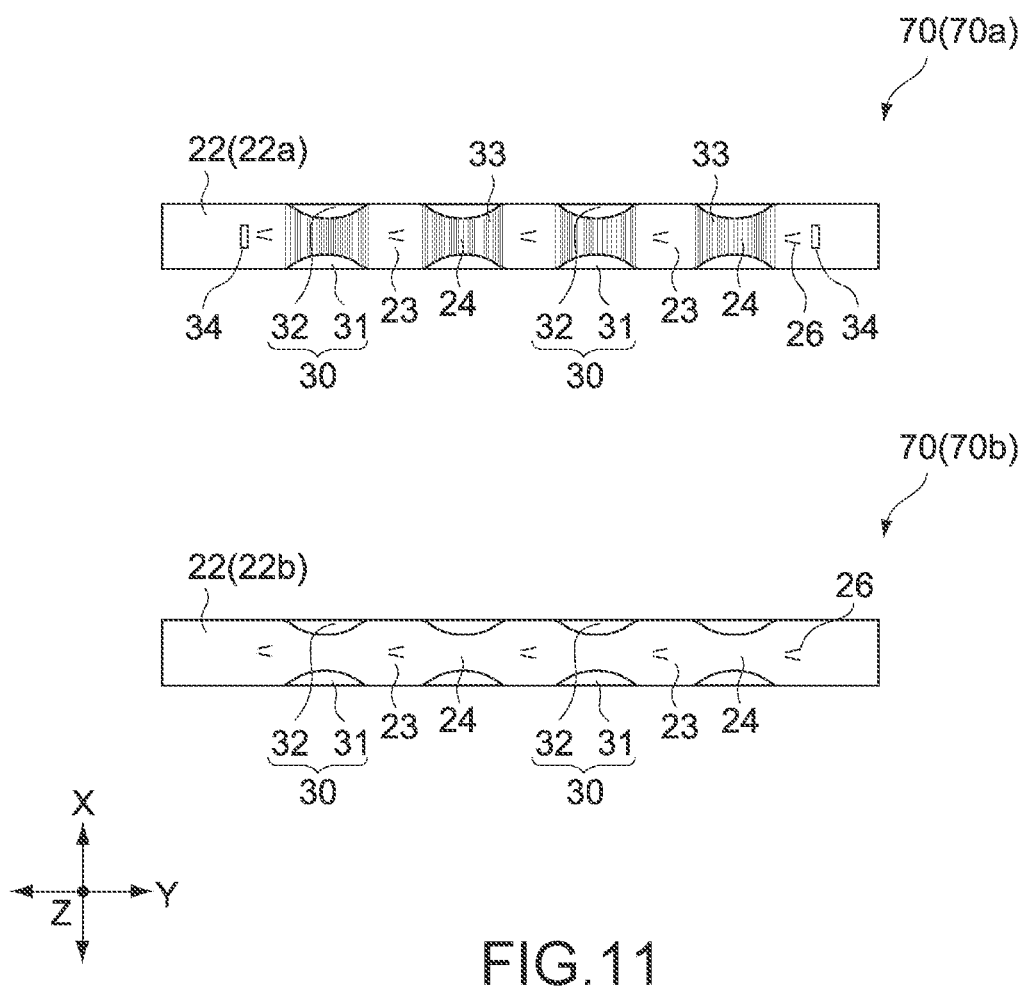
FIG. 11 is a schematic diagram showing recording surfaces of various dummies.
Figure 12:
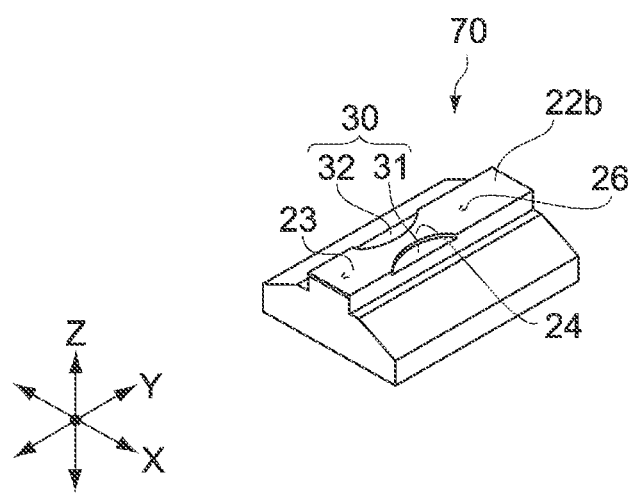
FIG. 12 is a perspective view showing part of the dummy in the length direction.

FIG. 11 is a schematic diagram showing the recording surfaces 22 (22a and 22b) of the various dummies 70. FIG. 12 is a perspective view showing part of the dummy 70 in the length direction.

Here, although the shape of the dummy 70 is the same as the shape of the upper part of the actual head block 20, the dummy 70 is different from the upper part of the head block 20 in that all portions are formed of a glass material.

A glass material is used as the material of the dummy 70 in order to evaluate the contact state the recording surface 22 and the magnetic tape 1 by the interference fringes of light. Note that although the magnetic gap 26 is drawn to indicate the position of the magnetic gap 26 in each drawing including the dummy 70, the magnetic gap 26 is not actually provided in the dummy 70.

In FIG. 11, two dummies 70 (70a and 70b) are shown. Two different types of recording surfaces 22 (22a and 22b) are prepared for the two dummies 70 in order to efficiently evaluate the contact state.

The dummy 70a on the upper side in FIG. 11 has a recording surface 22a having the same structure as that of the recording surface 22 of a thermal head 13 according to this embodiment shown in FIG. 7 and the like. As the dummy 70a, a dummy adopting the groove portion 331 on the upper side in FIG. 10 as the groove portion 33 and a dummy adopting the groove portion 332 on the lower side in FIG. 10 as the groove portion 33 were prepared. Meanwhile, the dummy 70b on the lower side in FIG. 11 has a recording surface 22b in which structures corresponding to the groove portion 33 and the recessed portion 34 are not formed. FIG. 12 corresponds to a perspective view of this dummy 70b having the recording surface 22b.

Figure 13:
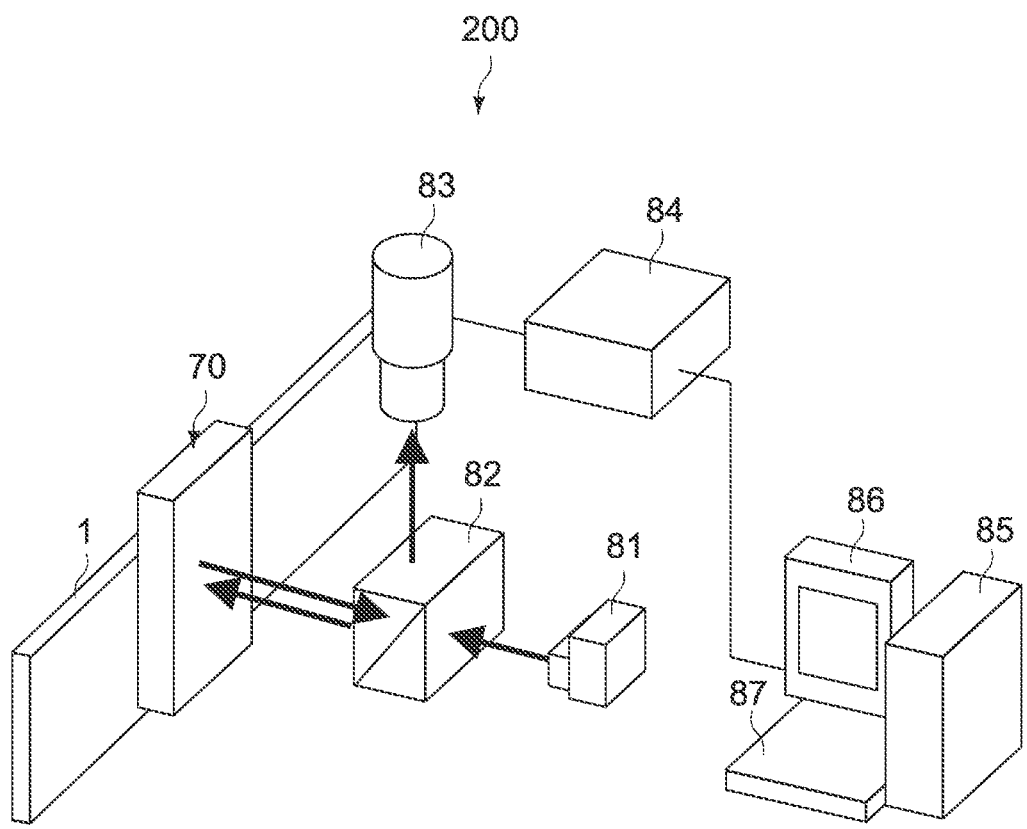
FIG. 13 is a schematic diagram showing an evaluation apparatus for evaluating the contact state between the recording surface and the travelling magnetic tape.
Figure 13:
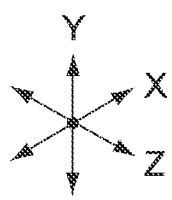

FIG. 13 is a schematic diagram showing the evaluation apparatus 200 for evaluating the contact state between the recording surface 22 and the travelling magnetic tape 1.

As shown in FIG. 13, the evaluation apparatus 200 includes a light source 81, a beam splitter 82, an imaging unit 83, an amplification unit 84, a control device 85, a display unit 86, and an input unit 87.

The light source 81 is configured to be capable of emitting monochromatic light in a specific wavelength region (e.g., red). The beam splitter 82 guides the reflected light reflected by the dummy 70 and the magnetic tape 1 to the side of the imaging unit 83 while causing the light emitted from the light source 81 to be transmitted therethrough.

The imaging unit 83 takes an image of the reflected light by the dummy 70 and the magnetic tape 1. The amplification unit 84 amplifies the signal of the image taken by the imaging unit 83 and outputs the amplified signal to the control device 85.

The control device 85 includes, for example, a control unit, a storage unit, a communication unit, and the like. The control unit includes, for example, a CPU (Central Processing Unit) and integrally controls the respective units of the evaluation apparatus 200 in accordance with the program stored in the storage unit.

The storage unit includes a non-volatile memory on which various types of data and various programs are to be recorded, and a volatile memory used as a work area of the control unit. The various programs described above may be read from a portable recording medium such as an optical disc and a semiconductor memory, or may be downloaded from a server apparatus on a network. The communication unit is configured to be capable of communicating with, for example, another apparatus such as a server apparatus.

The display unit 86 includes, for example, a liquid crystal display or an EL (Electro-Luminescence) display, and displays the image taken by the imaging unit 83 on the display in accordance with an instruction from the control device 85. The input unit 87 includes, for example, a keyboard or a contact sensor, inputs various instructions from a user, and outputs them to the control device 87.

Now, the movement of light will be described. First, the light emitted from the light source 81 passes through the beam splitter 82 to enter the dummy 70 from the rear surface side of the dummy 70 (on the side opposite to the recording surface 22). Part of the light that has entered the dummy 70 is reflected by the recording surface 22. Further, another part of the light that has entered the dummy 70 passes through the recording surface 22 and is reflected by the magnetic tape 1. The light reflected by the recording surface 22 and the magnetic tape 1 is guided by the beam splitter 82 to the side of the imaging unit 83, and an image thereof is taken by the imaging unit 83.

If there is a distance between the recording surface 22 and the magnetic tape 1, the reflected light from the recording surface 22 and the reflected light from the magnetic tape 1 strengthen or weaken each other in accordance with this distance, and thus, interference fringes appear in the image taken by the imaging unit 83.

Figure 14:
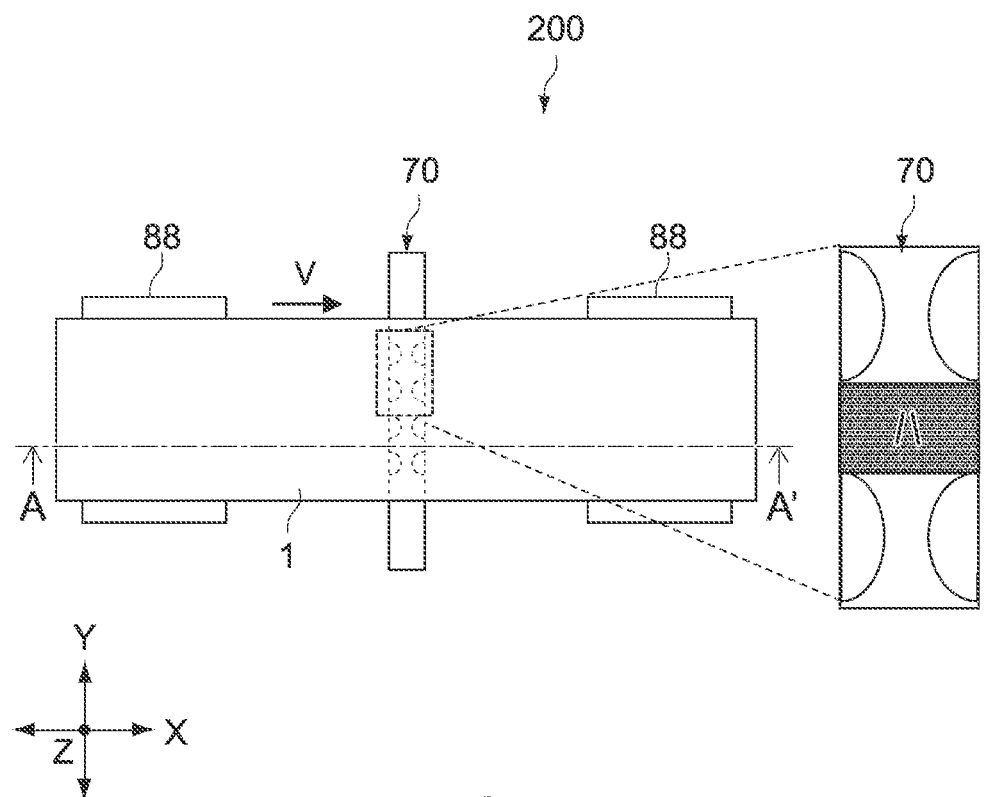
FIG. 14 is an enlarged view showing a relationship between the dummy and the magnetic tape in the evaluation apparatus.
Figure 15:
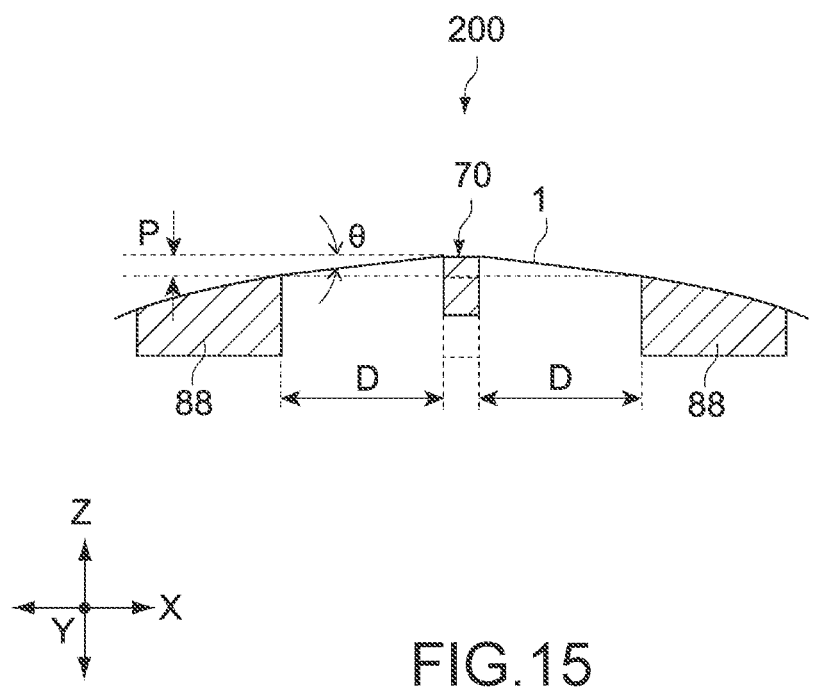
FIG. 15 is a cross-sectional view taken along the line A-A' shown in FIG. 13.

FIG. 14 is an enlarged view showing the relationship between the dummy 70 and the magnetic tape 1 in the evaluation apparatus 200. The left side of FIG. 14 shows how the evaluation apparatus 200 is viewed from the side of the magnetic tape 1. Further, the right of FIG. 14 shows an image of the dummy 70 and the magnetic tape 1. FIG. 15 is a cross-sectional view taken along the line A-A' shown in FIG. 14.

As shown in FIG. 14 and FIG. 15, the evaluation apparatus 200 includes guides 88 for guiding the magnetic tape 1, in addition to the respective units shown in FIG. 13. Note that although not shown, the evaluation apparatus 200 includes a drive device for causing the magnetic tape 1 to travel, a dummy moving mechanism for causing the dummy 70 to move to the side of the magnetic tape 1, and the like.

The two guides 88 are disposed with a predetermined distance from the dummy 70 at positions sandwiching the dummy 70 in the width direction of the dummy 70 (X-axis direction: travelling direction of the magnetic tape 1). A distance D between the dummy 70 and the guide 88 is 19.5 mm in this embodiment.

The dummy 70 is capable of moving in the thickness direction of the dummy 70 (Z-axis direction) by the dummy moving mechanism and protruding toward the side of the magnetic tape 1. Note that the distance by which the dummy 70 protrudes toward the side of the magnetic tape 1 to enter the magnetic tape 1 will be referred to as the penetration distance P below. The penetration distance P is based on the position of the dummy 70 when the magnetic tape 1 is flattened and the dummy 70 is in contact with this flattened magnetic tape 1 (penetration distance P=0).

Further, the angle formed between the recording surface 22 of the dummy 70 and the magnetic tape 1 when viewed from the length direction of the dummy 70 (Y-axis direction: width direction of the magnetic tape 1) will be referred to as the wrap angle θ below (not the portion of the magnetic tape 1 facing the recording surface 22 but portions on both sides sandwiching the portion facing the recording surface 22 in the travelling direction of the magnetic tape 1). Note that in the case where the penetration distance P is 0, the wrap angle θ is 0°.

Note that a speed V at which the magnetic tape 1 is caused to travel is 10 m/s in this embodiment.

(Evaluation of Groove Portion)

First, the groove portion 33 formed in the second region 22 in the recording surface 22 was evaluated.

Figure 16:
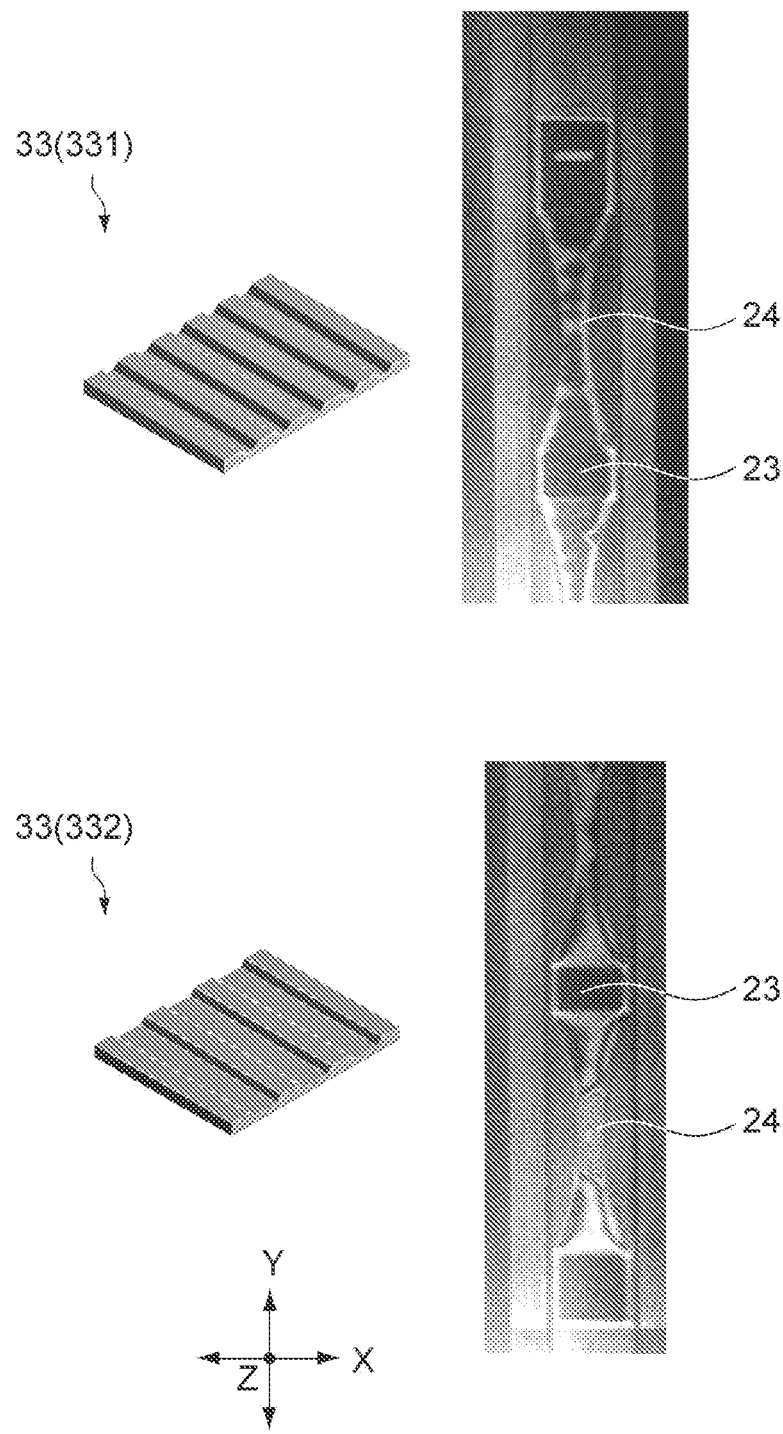
FIG. 16 is a diagram showing an image taken by an imaging unit of the evaluation apparatus.

FIG. 16 shows an image of the dummy 70a taken by the imaging unit 83 of the evaluation apparatus 200. The upper side in FIG. 16 shows an image of the dummy 70a including the groove portion 33 (331) shown on the upper side of FIG. 10, and the lower side in FIG. 16 shows an image of the dummy 70a including the groove portion 33 (332) shown on the lower side of FIG. 10. For each dummy 70a, the penetration distance P was set to 1 mm and the sliding width of the magnetic tape 1 with respect to the recording surface 22 in the X-axis direction (hereinafter, referred to simply as the sliding width) was set to 0.8 mm.

In both the upper side and the lower side of FIG. 16, the portion corresponding to the first region 23 is black in the substantially entire region. This indicates that the magnetic tape 1 is in flat contact in the substantially entire region of the first region 23.

Meanwhile, when the portions corresponding to the second region 24 are compared with each other, the formation region of interference fringes is wider in the lower diagram of FIG. 16 than in the upper diagram of FIG. 16. In particular, clear interference fringes with a narrow pitch of light and dark were observed in the central portion of the second region 24 in the longitudinal direction (Y-axis direction). This indicates that the floating amount of the magnetic tape 1 from the second region 24 is higher in the dummy 70a (lower side of FIG. 16) including the groove portion 332 with a wider groove width.

Note that the interference fringes indicate, so to speak, contour lines. The interference fringes in the second region 24 will be specifically described. The magnetic tape 1 is farthest from the recording surface 22 at the central portion of the second region 24 in the length direction (Y-axis direction) and gradually approaches the recording surface 22 as it approaches both ends of the second region 24 in the length direction.

Note that the reason why the magnetic tape 1 floats on the second region 24 of the recording surface 22 is considered as follows. First, when the magnetic tape 1 travels, the air layer adhering to the magnetic tape 1 generates a small amount of air current in the travelling direction. The notch portion 30 for forming the second region 24 is provided in the facing portion 21, and the airflow flows into the notch 31 (on the left side in the image) located on the upstream side in the tape travelling direction of this notch portion 30.

The airflow that has flowed into the notch 31 on the upstream side in the tape travelling direction enters between the second region 24 of the recording surface 22 and the magnetic tape 1 and causes the magnetic tape 1 to float from the second region 24 of the recording surface 22. After causing the magnetic tape 1 to float, this airflow flows into the notch 32 on the downstream side in the tape travelling direction and is released to the outside. This is the reason why the magnetic tape 1 floats.

The groove portion 33 provided in the second region 24 increases the amount of air entering between the second region 24 and the magnetic tape 1. When comparing the top and bottom of FIG. 16, although the floating of the magnetic tape 1 in the second region 24 is recognized, adopting the groove portion 332 having a wider groove width is considered to make the floating amount of the magnetic tape 1 higher because the amount of air flowing through the second region 24 is larger.

On the basis of the above considerations, in the following evaluation, an experiment was performed using the dummy 70a including the groove portion 332 (lower side in FIG. 10) having a wider groove width as the dummy 70a.

(Comparison Between Dummy 70a and Dummy 70b)

Subsequently, the effects of causing the magnetic tape 1 in the second region 24 to float were compared using the dummy 70a that includes the groove portion 33 (332) and the dummy 70b that does not include the groove portion 33.

Figure 17:
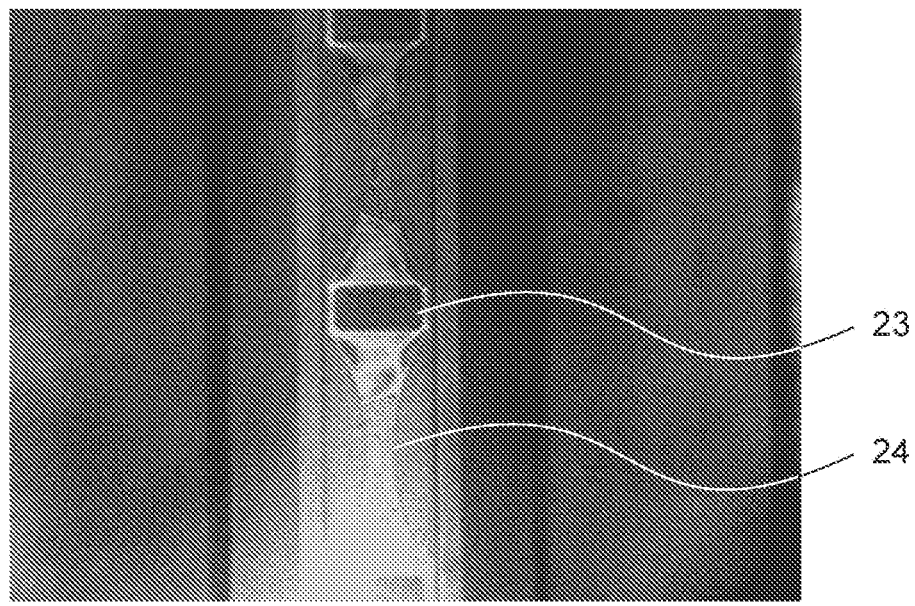
FIG. 17 is a diagram showing an image taken by the imaging unit of the evaluation apparatus.
Figure 17:
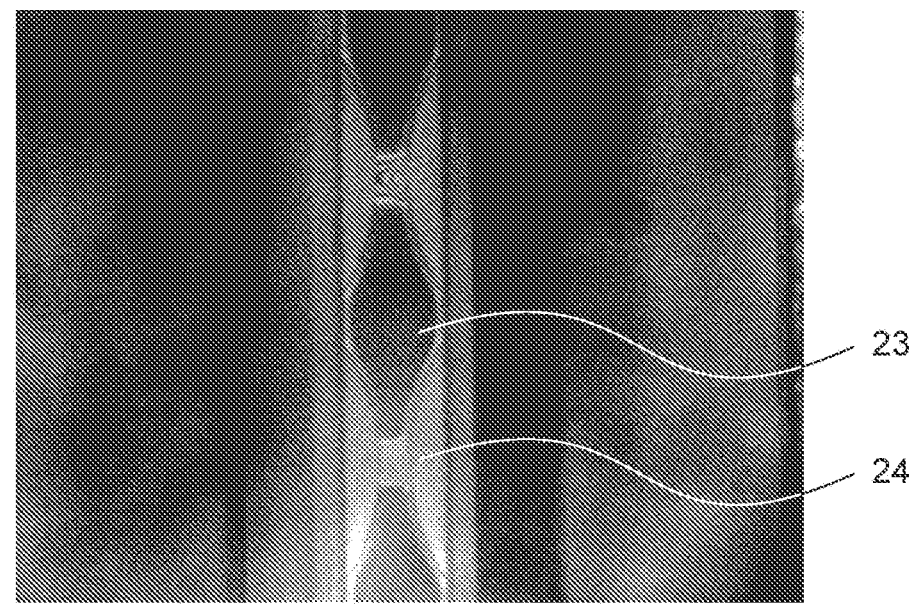

FIG. 17 shows images of the dummies 70a and 70b taken by the imaging unit 83 of the evaluation apparatus 200. The upper side in FIG. 17 shows an image of the dummy 70a, and the lower side in FIG. 17 shows an image of the dummy 70b. For each of the dummies 70a and 70b, the penetration distance P was set to 1 mm and the sliding width was set to 1 mm.

When comparing the upper and lower images in FIG. 17 with each other, it is common that the portion corresponding to the first region 23 is black in the substantially entire region. That is, it indicates that the magnetic tape 1 is in flat contact with the first region 23 for both the dummies 70a and 70b.

Meanwhile, focusing on the portion corresponding to the second region 24, it was confirmed that the dummy 70a (upper part in FIG. 17) was floating on the magnetic tape 1 from the entire region of the second region 24.

Meanwhile, in the dummy 70b (lower part in FIG. 17), interference fringes were observed only in the vicinity of the central portion of the second region 24. This indicates that the floating range of the magnetic tape 1 in the second region 24 is partial.

Figure 18:
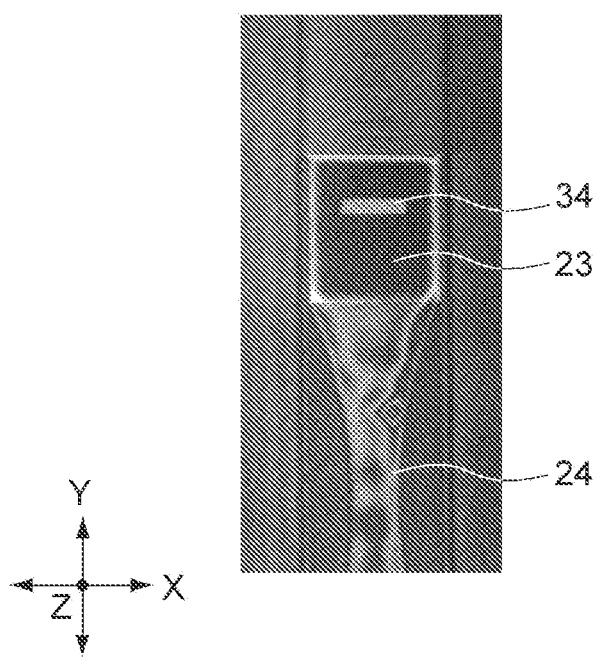
FIG. 18 is a diagram showing an image taken by the imaging unit of the evaluation apparatus.

FIG. 18 shows an image of the evaluation apparatus 200 for the first region 23 located at one end portion of the recording surface 22 in the longitudinal direction (Y-axis direction). Also in this figure, the flat contact of the magnetic tape 1 in the first region 23 can be confirmed. In particular, since this first region 23 is located on the edge side of the magnetic tape 1, the edge of the magnetic tape 1 is likely to be turned up by the airflow during travelling.

However, as shown in the figure, since the recessed portion 34 is provided in the first region 23 in this embodiment, it is possible to cause the edge region of the magnetic tape 1 to stably come into contact with the first region 23 by using the pressure difference generated between the inside of the recessed portion 34 and the outside air.

As is clear from the above results, by providing the groove portion 33 in the second region 24 of the recording surface 22, it is possible to increase the floating range of the magnetic tape 1 in the second region 24 as compared with the case where no groove portion is provided. As a result, it is possible to cause the magnetic tape 1 to travel substantially without contact with the second region 24 while causing the magnetic tape 1 to stably come into contact with the first region 23 including the magnetic gap 26, and thus, it is possible to reduce the friction between the recording surface 22 and the magnetic tape 1. As a result, it is possible to make the flow of the magnetic tape 1 against the recording surface 22 smooth, and thus, it is possible to improve the recording accuracy of the servo pattern 7.

Figure 19:
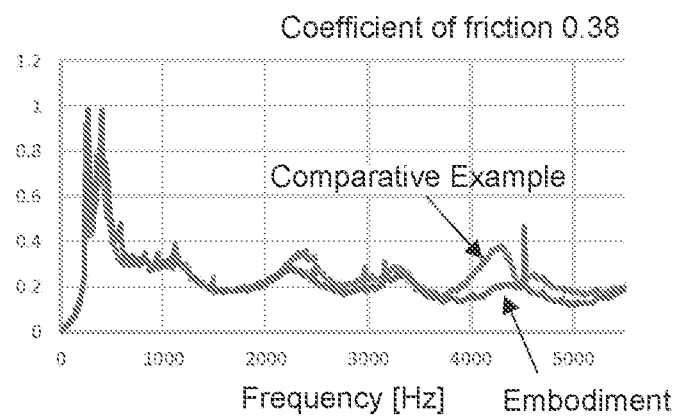
FIG. 19 shows an experimental result describing the action of the servo write head according to this embodiment.
Figure 19:
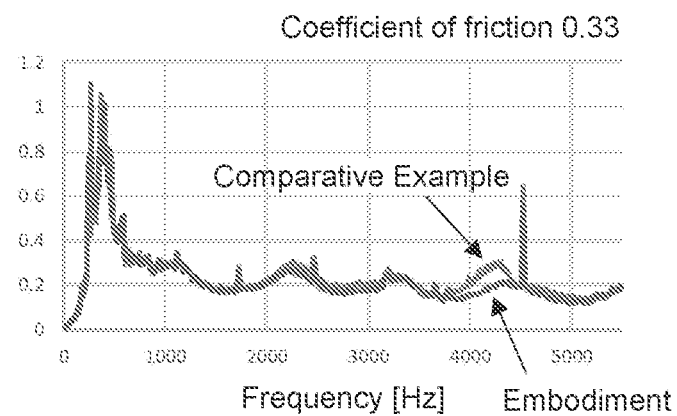
Figure 19:
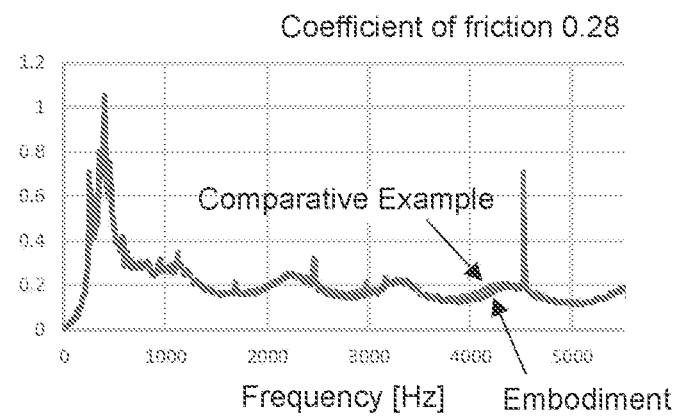

FIG. 19 is an experimental result showing the frequency properties of the thermal head 13, which has been performed using three magnetic tapes having different coefficients of friction with respect to the thermal head 13 according to this embodiment including the groove portion 33. For comparison, an experimental result for a thermal head that does not include the groove portion 33 (Comparative Example) is also shown.

Here, magnetic tapes having coefficients of friction against the thermal head 13 of 0.38 (top in the figure), 0.33 (middle in the figure), and 0.28 (bottom in the figure) were used.

As shown in the figure, the improvement was observed on the higher frequency side (4000 to 5000 Hz) as the coefficient of friction increases.

Second Embodiment

Next, a second embodiment of this embodiment will be described.

In this embodiment, an example of application to a magnetic head of a tape drive device will be described as a magnetic head.

Figure 20:
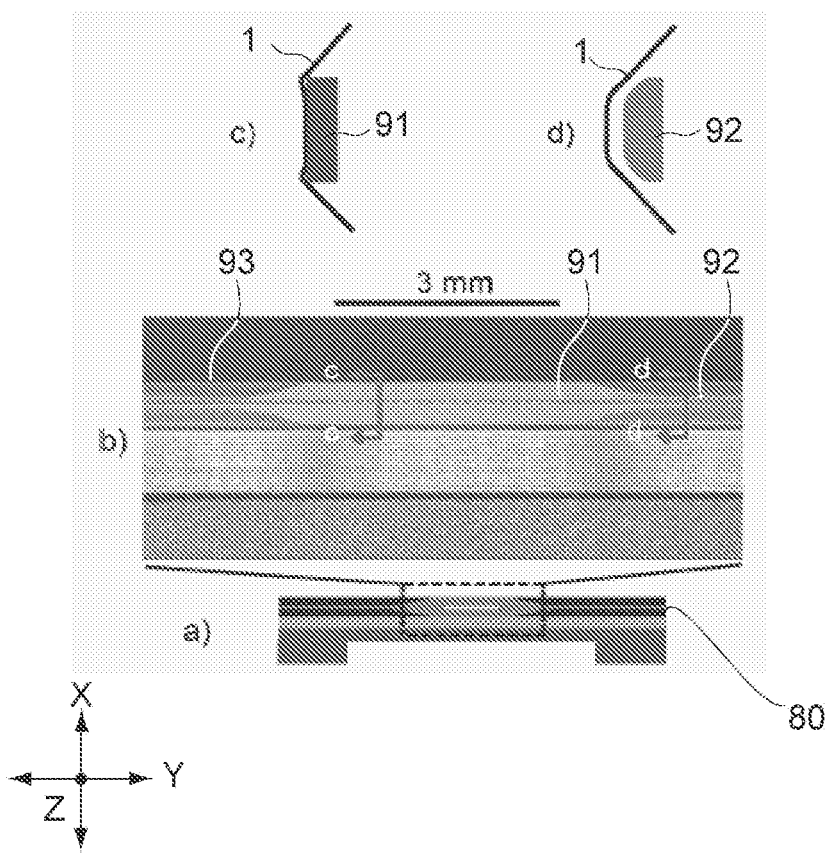
FIG. 20 is a schematic diagram showing a configuration of a magnetic head for recording and reproduction.

FIG. 20 is a schematic configuration diagram of a magnetic head 80 of a tape drive device according to this embodiment. Part a) is a plan view, Part b) is an enlarged view of the Part a), Part c) is a cross-sectional view taken along the line c-c in the Part b), and Part d) is a cross-sectional view taken along the line d-d in the Part b).

In the Parts a) and b) of FIG. 20, the X-axis direction corresponds to the width direction of the magnetic head 80 (the tape travelling direction) and the Y axis corresponds to the length direction of the magnetic head 80 (tape width direction).

As shown in the Part b) of FIG. 20, the magnetic head 80 has a recording surface 93 (head surface) including a head disposing region 91 in which a recording/reproducing head unit for recording is disposed and both end regions 92 in which the recording/reproducing head unit is not disposed, the both end regions 92 being located at both ends in the length direction (Y-axis direction).

The both end regions 92 are notched in a predetermined shape in the width direction of the magnetic head 80 similarly to the first embodiment, so that the width of the surface facing the magnetic tape 1 is narrower than that of the head disposing region 91. For this reason, the airflow flows into the notch located on the upstream side in the tape travelling direction, of the notches formed in the both end regions 92, and this airflow has the effect of causing the magnetic tape 1 to float from the recording surface 93 (see Part d) of FIG. 20). As a result, it is possible to make the flow of the magnetic tape 1 against the recording surface 93 smooth, and thus, it is possible to improve the accuracy for recording and reproducing data on the magnetic tape 1.

Figure 21:
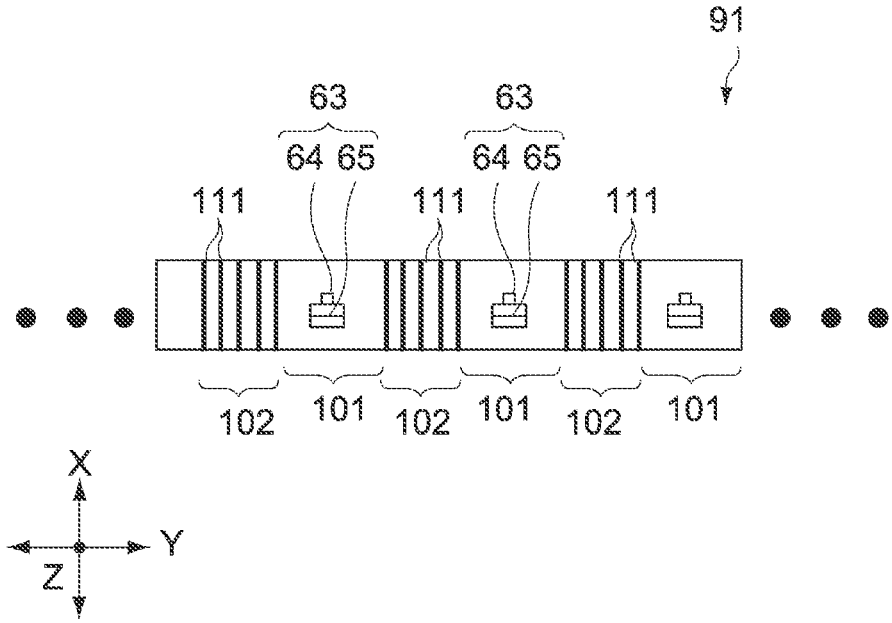
FIG. 21 is an enlarged schematic diagram showing a recording surface of the magnetic head.

Next, FIG. 21 is a further schematic enlarged view of the head disposing region 91. As shown in the figure, in the head disposing region 91, a plurality of recording/reproducing head units 63 is arranged at intervals in the head longitudinal direction. The recording/reproducing head unit 63 includes a data write head unit 64 and a data read head unit 65. The data write head unit 64 includes a magnetic gap. The data read head unit 65 includes a magnetoresistive element (MR element). The magnetic head 80 functions as a recording head when recording data on the magnetic tape 1 by the data write head unit 64 and function as a reproduction head when reproducing the data recorded on the magnetic tape 1 by the data read head unit 65.

The head disposing region 91 has a first region 101 in which the recording/reproducing head unit 63 is provided and a second region 102 in which the recording/reproducing head unit 63 is not provided. In this embodiment, a plurality of groove portions 111 is provided over both ends of the second region 102 in the head width direction (X-axis direction). The groove portion 111 is formed in a shape similar to that of the groove portion 33 (FIG. 10) in the above-mentioned first embodiment.

The plurality of groove portions 111 is linearly formed in parallel in the head width direction (X-axis direction). The groove portions 111 are arranged at intervals in the head length direction (Y-axis direction) in the second region 102. The arrangement pitch of the groove portions 111, is for example, 83 μm in the magnetic head having a 32 ch structure in which 32 recording/reproducing head units 63 are arranged.

In the magnetic head 80 according to this embodiment configured as described above, the magnetic tape 1 is caused to travel in a width direction orthogonal to a length direction on the recording surface 93 having the first region 101 corresponding to the position where a magnetic gap (data write head unit 64) is provided in the length direction and the second region 102 corresponding to the position where the magnetic gap is not provided in the length direction, the plurality of groove portions 111 crossing from one end in the width direction to the other end in the width direction being provided in the second region 102, and a data signal is recorded on the magnetic tape 1 by the magnetic gap while causing the magnetic tape 1 to be in contact with the first region 101 and at least part of the magnetic tape 1 to float from the second region 102. Since the plurality of groove portions 111 is arranged in the second region 102 in which the recording/reproducing head unit 63 is not arranged, it is possible to reduce the friction of the magnetic tape 1 travelling on the recording surface 93 against the second region 102. As a result, it is possible to improve the recording accuracy of a data signal. Further, it is possible to improve the reproduction accuracy of a data signal.

Note that although a head structure in which both the data write head unit 64 and the data read head unit 65 are formed on the common recording surface 93 has been described as an example in the above embodiments, the data read head unit 65 may be formed on a head surface different from the recording surface 93 on which the data write head unit 64 is formed. In this case, the head surface extends in a direction (longitudinal direction of the magnetic head) orthogonal to the tape travelling direction, and the data read head unit and the data write head unit are disposed so as to face each other in the tape travelling direction (width direction of the magnetic head). The head surface may be disposed between two recording surfaces facing each other in the tape travelling direction (width direction of the magnetic head). A data write head is formed on each recording surface.

Also in such a configuration, effects similar to those described above can be achieved by forming the plurality of groove portions 111 between the plurality of data write head units adjacent to each other in the longitudinal direction of the magnetic head and between the plurality of data read head units.

[Details of Magnetic Tape]

Subsequently, details of the magnetic tape 1 will be described.

The magnetic tape 1 has a long tape shape and is caused to travel in the longitudinal direction during recording and reproduction. Note that the surface of the magnetic layer 4 is a surface on which a magnetic head included in a recording/reproduction apparatus (not shown) is caused to travel. The magnetic tape 1 is favorably used in a recording/reproduction apparatus including a ring-type head as a recording head. The magnetic tape 1 is favorably used in a recording/reproduction apparatus configured to be capable of recording data with a data track width of 1500 nm or less or 1000 nm or less.

(Base Material)

As shown in FIG. 2, the base material 2 is a non-magnetic support that supports the non-magnetic layer 3 and the magnetic layer 4. The base material 2 has a long film shape. The upper limit value of the average thickness of the base material 2 is favorably 4.2 μm or less, more favorably 4.0 μm or less, still more favorably 3.8 μm or less, and most favorably 3.4 μm or less. When the upper limit value of the average thickness of the base material 2 is 4.2 μm or less, it is possible to make the recording capacity of a single data cartridge larger than that of a general magnetic tape. The lower limit value of the average thickness of the base material 2 is favorably 3 μm or more, and more favorably 3.2 μm or more. When the lower limit value of the average thickness of the base material 2 is 3 μm or more, it is possible to suppress a decrease in the strength of the base material 2.

The average thickness of the base material 2 is obtained as follows. First, the magnetic tape 1 having a width of ½ inch is prepared and cut into a length of 250 mm to prepare a sample. Subsequently, the layers of the sample other than the base material 2 (i.e., the non-magnetic layer 3, the magnetic layer 4, and the magnetic layer 5) are removed with a solvent such as MEK (methyl ethyl ketone) and dilute hydrochloric acid. Next, a Laser Hologage (LGH-110C) manufactured by Mitutoyo Corporation is used as a measuring apparatus to measure the thickness of the sample (base material 2) at five or more positions, and the measured values are simply averaged (arithmetically averaged) to calculate the average thickness of the base material 2. Note that the measurement positions are randomly selected from the sample.

the base material 2 favorably contains polyester. When the base material 2 contains polyester, the Young's modulus of the base material 2 in the longitudinal direction can be reduced. Therefore, it is possible to keep the width of the magnetic tape 1 constant or substantially constant by adjusting the tension of the magnetic tape 1 in the longitudinal direction during travelling by the recording/reproduction apparatus. The Young's modulus of the base material 2 in the longitudinal direction is, for example, 5 GPa or more and 10 GPa or less, favorably 2.5 GPa or more and 7.8 GPa or less, and more favorably 3.0 GPa or more and 7.0 GPa or less.

The polyester includes, for example, at least one of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), or polyethylene bisphenoxycarboxylate. In the case where the base material 2 contains two or more types of polyesters, the two or more types of polyesters may be mixed, may be copolymerized, or may be stacked. At least one of the terminal or the side chain of the polyester may be modified.

The fact that the base material 2 contains polyester can be confirmed, for example, as follows. First, the magnetic tape 1 is prepared and cut into a length of 250 mm to prepare a sample and then the layers of the sample other than the base material 2 are removed in a way similar to that in the measurement method of the average thickness of the base material 2. Next, the IR spectrum of the sample (base material 2) is acquired using the infrared absorption spectrometry (IR). On the basis of this IR spectrum, the fact that the base material 2 contains polyester can be confirmed.

The base material 2 may further contain, for example, at least one of polyamide, polyetheretherketone, polyimide, polyamideimide, or polyetheretherketone (PEEK) in addition to the polyester, or may further contain at least one of polyamide, polyimide, polyamideimide, polyolefins, a cellulose derivative, a vinyl resin, or another polymer resin. The polyamide may be aromatic polyamide (aramid). The polyimide may be aromatic polyimide. The polyamideimide may be aromatic polyamideimide.

In the case where the base material 2 contains a polymer resin other than polyester, the base material 2 favorably contains polyester as a main component. Here, the main component means the component with the highest content (mass ratio), of the polymer resins contained in the base material 2. In the case where the base material 2 contains a polymer resin other than polyester, the polyester and the polymer resin other than the polyester may be mixed or may be copolymerized.

The base material 2 may be biaxially stretched in the longitudinal direction and the width direction. The polymer resin contained in the base material 2 is favorably oriented in an oblique direction with respect to the width direction of the base material 2.

(Magnetic Layer)

The magnetic layer 4 is a recording layer for recording a signal with a magnetization pattern. The magnetic layer 4 may be a recording layer of a perpendicular recording type or may be a recording layer of a longitudinal recording type. The magnetic layer 4 contains, for example, magnetic powder, a binder, and a lubricant. The magnetic layer 4 may further contain at least one additive of an antistatic agent, an abrasive, a curing agent, a rust inhibitor, a non-magnetic reinforcing particle, or the like, as necessary. The magnetic layer 4 does not necessarily need to include a coating film of a magnetic material and may include a sputtering film or a deposition film of a magnetic film.

An arithmetic average roughness Ra of the surface of the magnetic layer 4 is 2.0 nm or less, favorably 1.8 nm or less, and more favorably 1.6 nm or less. When the arithmetic average roughness Ra is 2.0 nm or less, since the output reduction due to spacing loss can be suppressed, excellent electromagnetic conversion characteristics can be achieved. The lower limit value of the arithmetic average roughness Ra of the surface of the magnetic layer 4 is favorably 1.0 nm or more, and more favorably 1.2 nm or more. When the lower limit value of the arithmetic average roughness Ra of the surface of the magnetic layer 4 is 1.0 nm or more, it is possible to suppress deterioration of the traveling property due to an increase in friction.

The arithmetic average roughness Ra can be obtained as follows. First, the surface of the magnetic layer 4 is observed by an atomic force microscope (AFM) to obtain an AFM image of 40 μm×40 μm. Nano Scope IIIa D3100 manufactured by Digital Instruments is used as the AFM, one formed of silicon single crystal is used as a cantilever (Note 1), and measurement is performed by turning at 200 to 400 Hz as the tapping frequency. Next, the AFM image is divided into 512×512 (=262,144) measurement points, a height Z(i) (i: measurement point numbers, i=1 to 262,144) is measured at each measurement point, and the heights Z (i) at the respective measurement points are simply averaged (arithmetically averaged) to obtain an average height (average surface) Zave (=(Z(1)+Z (2)++Z(262,144))/262,144). Subsequently, a deviation Z" (i) from an average center line at each measurement point (=Z(i)−Zave) is obtained to calculate the arithmetic average roughness Ra [nm] (=(Z" (1)+Z" (2)+ . . . +Z"(262,144))/262,144). At this time, one that has been subjected to filtering by second-order Flatten and third-order planefit in XY as image processing is used as data.

(Note 1) SPM Probe NCH of a Normal Type, POINT-PROBE Manufactured by NanoWorld

L (cantilever length)=125 μm

The upper limit value of an average thickness $t_m$ of the magnetic layer 4 is 80 nm or less, favorably 70 nm or less, and more favorably 50 nm or less. When the upper limit value of the average thickness $t_m$ of the magnetic layer 4 is 80 nm or less, the influence of the demagnetizing field can be reduced in the case where a ring-type head is used as the recording head, and thus, more excellent electromagnetic conversion characteristics can be achieved.

The lower limit value of the average thickness $t_m$ of the magnetic layer 4 is favorably 35 nm or more. When the lower limit value of the average thickness $t_m$ of the magnetic layer 4 is 35 nm or more, the output can be ensured in the case where an MR-type head is used as the reproduction head, and thus, more excellent electromagnetic conversion characteristics can be achieved.

The average thickness $t_m$ of the magnetic layer 4 is obtained as follows. First, the magnetic tape 1 housed in the cartridge 10 is unwound, and the magnetic tape 1 is cut at three positions of 10 m, 30 m, and 50 m from one end thereof on the outermost periphery side to prepare three samples. Subsequently, each sample (the magnetic tape 1 to be measured) is processed by an FIB method or the like to obtain a slice. In the case of using an FIB method, a carbon layer and a tungsten layer are formed as protective films as pre-processing for observing a TEM image of a cross section described below. The carbon layer is formed on each of the surfaces of the magnetic tape 1 on the side of the magnetic layer 4 and on the side of the magnetic layer 5 by a vapor deposition method and the tungsten layer is further formed on the surface on the side of the magnetic layer 4 by a vapor deposition method or a sputtering method. The slicing is performed along a length direction (longitudinal direction) of the magnetic tape 1. That is, the slicing forms a cross section parallel to both the longitudinal direction and the thickness direction of the magnetic tape 1.

The cross section described above of the obtained sliced sample is observed through a transmission electron microscope (TEM) under the following conditions to obtain a TEM image of each sliced sample. Note that the magnification and the acceleration voltage may be adjusted as appropriate in accordance with the type of apparatus.

Apparatus: TEM (H9000NAR manufactured by Hitachi, Ltd.)
Acceleration voltage: 300 kV
Magnification: 100,000 times Next, the thickness of the magnetic layer 4 is measured at at least ten or more positions of each sliced sample using the obtained TEM image of each sliced sample. Note that since the slicing is performed along the longitudinal direction of the magnetic tape 1 as described above, the 10 measurement positions of each sliced sample are randomly selected from the test piece such that they are different positions in the longitudinal direction of the magnetic tape 1. The average value obtained by simply averaging (arithmetically averaging) the obtained measured values of each sliced sample (thickness of the magnetic layer 4 at a total of 30 points) is used as the average thickness $t_m$ [nm] of the magnetic layer 4.

(Magnetic Powder)

The magnetic powder includes a plurality of magnetic particles. The magnetic particles are, for example, particles including hexagonal ferrite (hereinafter, referred to as "hexagonal ferrite particles"), particles including epsilon-iron oxide (E-iron oxide) (hereinafter, referred to as "ε-iron oxide particles"), or particles including Co-containing spinel ferrite (hereinafter, referred to as "cobalt ferrite particles"). The magnetic powder is favorably crystal-oriented preferentially in the thickness direction of the magnetic tape 1 (perpendicular direction).

(Hexagonal Ferrite Particles)

Each of the hexagonal ferrite particles has a plate shape such as a hexagonal plate shape or a columnar shape such as a hexagonal columnar shape (where the thickness or height is smaller than the major axis of the plate surface or bottom surface). In this specification, the hexagonal plate shape includes a substantially hexagonal plate shape. The hexagonal ferrite contains favorably at least one of Ba, Sr, Pb, or Ca, and more favorably at least one of Ba or Sr. The hexagonal ferrite may specifically be barium ferrite or strontium ferrite, for example. The barium ferrite may further contain at least one of Sr, Pb, or Ca in addition to Ba. The strontium ferrite may further contain at least one of Ba, Pb, or Ca in addition to Sr.

More specifically, the hexagonal ferrite has an average composition represented by a general formula of $MFe_{12}O_{19}$. However, M is, for example, at least one metal of Ba, Sr, Pb, or Ca, and favorably at least one metal of Ba or Sr. M may be a combination of Ba and one or more metals selected from the group consisting of Sr, Pb, and Ca. Further, M may be a combination of Sr and one or more metals selected from the group consisting of Ba, Pb, and Ca. In the general formula described above, some Fes may be substituted by another metal element.

In the case where the magnetic powder includes powder of the hexagonal ferrite particles, the average particle size of the magnetic powder is favorably 13 nm or more and 22 nm or less, more favorably 13 nm or more and 19 nm or less, still more favorably 13 nm or more and 18 nm or less, particularly favorably 14 nm or more and 17 nm or less, and most favorably 14 nm or more and 16 nm or less. When the average particle size of the magnetic powder is 22 nm or less, more excellent electromagnetic conversion characteristics (e.g., SNR) can be achieved in the magnetic tape 1 having high recording density. Meanwhile, when the average particle size of the magnetic powder is 13 nm or more, the dispersibility of the magnetic powder is further improved and further excellent electromagnetic conversion characteristics (e.g., SNR) can be achieved.

In the case where the magnetic powder includes powder of the hexagonal ferrite particles, the average aspect ratio of the magnetic powder is favorably 1.0 or more and 3.0 or less, more favorably 1.5 or more and 2.8 or less, and still more favorably 1.8 or more and 2.7 or less. When the average aspect ratio of the magnetic powder is within a range of 1.0 or more and 3.0 or less, agglomeration of the magnetic powder can be suppressed. Further, the resistance applied to the magnetic powder when perpendicularly orienting the magnetic powder in the process of forming the magnetic layer 4 can be suppressed. Therefore, it is possible to improve the perpendicular orientation property of the magnetic powder.

In the case where the magnetic powder includes powder of the hexagonal ferrite particles, the average particle size and the average aspect ratio of the magnetic powder are obtained as follows. First, the magnetic tape 1 to be measured is processed by an FIB method or the like to obtain a slice. In the case of using an FIB method, a carbon layer and a tungsten layer are formed as protective films as pre-processing for observing a TEM image of a cross section described below. The carbon layer is formed on each of the surfaces of the magnetic tape 1 on the side of the magnetic layer 4 and on the side of the magnetic layer 5 by a vapor deposition method and the tungsten layer is further formed on the surface on the side of the magnetic layer 4 by a vapor deposition method or a sputtering method. The slicing is performed along a length direction (longitudinal direction) of the magnetic tape 1. That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section described above of the obtained slice sample such that the entire magnetic layer 43 is included with respect to the thickness direction of the magnetic layer 4 at the acceleration voltage: 200 kV and the total magnification: 500,000 times to take a TEM photograph. The number of TEM photographs to be prepared is the number that 50 particles for which a plate diameter DB and a plate thickness DA (see FIG. 22) shown below can be measured can be extracted.

Figure 22:
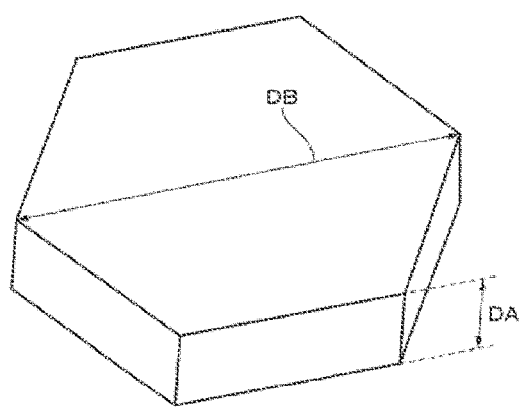
FIG. 22 is an explanatory diagram of a particle shape of hexagonal ferrite that is a magnetic powder.

In this specification, regarding the size of the hexagonal ferrite particles (hereinafter, referred to as a "particle size".), in the case where the shape of the particle observed in the TEM photograph described above is a plate shape or a columnar shape (where the thickness or height is smaller than the major axis of the plate surface or bottom surface.) as shown in FIG. 22, the major axis of the plate surface or bottom surface is used as the value of the plate diameter DB. The thickness or height of the particle observed in the TEM photograph described above is used as the value of the plate thickness DA. In the case where the plate surface or bottom surface of the particle observed in the TEM photograph has a hexagonal shape, the major axis means the longest diagonal distance. In the case where the thickness of height or the particle is not constant in one particle, the maximum thickness or height of the particle is used as the plate thickness DA.

Next, 50 particles to be extracted from the taken TEM photograph are selected on the basis of the following criteria. Particles partially protruding outside the field of view of the TEM photograph are not measured, and particles with clear contours and present in isolation are measured. In the case where particles overlap, each of particles is measured as a single particle if the boundary between the particles is clear and the shape of the entire particle can be determined. However, particles whose boundaries are unclear and whose overall shape cannot be determined are not measured because the shape of the particle cannot be determined.

The plate thickness DA of each of the selected 50 particles is measured. The plate thicknesses DA obtained in this way are simply averaged (arithmetically averaged) to obtain an average plate thickness $DA_{ave}$. The average plate thickness $DA_{ave}$ is the average particle plate thickness. Subsequently, a plate diameter DB of each magnetic powder is measured. In order to measure the plate diameter DB of the particle, 50 particles whose plate diameter DB can be clearly checked are selected from the taken TEM photograph. The plate diameter DB of each of the selected 50 particles is measured. The plate diameters DB obtained in this way are simply averaged (arithmetically averaged) to obtain an average plate diameter $DB_{ave}$. The average plate diameter $DB_{ave}$ is the average particle size. Then, an average aspect ratio ($DB_{ave}/DA_{ave}$) of the particles is obtained on the basis of the average plate thickness $DA_{ave}$ and the average plate diameter $DB_{ave}$.

In the case where the magnetic powder includes powder of the hexagonal ferrite particles, the average particle volume of the magnetic powder is favorably 500 nm$^3$ or more and 2500 nm$^3$ or less, more favorably 500 nm$^3$ or more and 1600 nm$^3$ or less, still more favorably 500 nm$^3$ or more and 1500 nm$^3$ or less, particularly favorably 600 nm$^3$ or more and 1200 nm$^3$ or less, and most favorably 600 nm$^3$ or more and 1000 nm$^3$ or less. When the average particle volume of the magnetic powder is 2500 nm$^3$ or less, an effect similar to that in the case where the average particle size of the magnetic powder is 22 nm or less can be achieved. Meanwhile, when the average particle volume of the magnetic powder is 500 nm$^3$ or more, an effect similar to that in the case where the average particle size of the magnetic powder is 13 nm or more can be achieved.

The average particle volume of the magnetic powder is obtained as follows. First, as described above with respect to the method of calculating the average particle size of the magnetic powder, the average major axis length $DA_{ave}$ and the average plate diameter $DB_{ave}$ are obtained. Next, an average volume V of the magnetic powder is obtained in accordance with the following formula.

$$V = \frac{3\sqrt{3}}{8} \times DA_{ave} \times DB_{ave} \times DB_{ave} \qquad [\text{Math. 1}]$$

(ε-Iron Oxide Particles)

The ε-iron oxide particles are hard magnetic particles capable of achieving a high coercive force even as minute particles. The ε-iron oxide particles each have a spherical shape or a cubic shape. In this specification, the spherical shape includes a substantially spherical shape. Further, the cubic shape includes a substantially cubic shape. Since the E-iron oxide particles have the shape as described above, it is possible to reduce the contact area of the particles in the thickness direction of the magnetic tape 1 and suppress agglomeration of the particles in the case where the ε-iron oxide particles are used as the magnetic particles, as compared with the case where barium ferrite particles having a hexagonal plate shape are used as the magnetic particles. Therefore, it is possible to enhance the dispersibility of the magnetic powder and achieve further excellent electromagnetic conversion characteristics (e.g., SNR).

Each of the ε-iron oxide particles has a core-shell structure. Specifically, the ε-iron oxide particle includes a core portion and a shell portion having a two-layer structure provided around the core portion. The shell portion having the two-layer structure includes a first shell portion provided on the core portion and a second shell portion provided on the first shell portion.

The core portion contains a-iron oxide. The ε-iron oxide contained in the core portion is favorably one having ε-Fe$_2$O$_3$ crystals as the main phase, and more favorably one formed of single-phase ε-Fe$_2$O$_3$.

The first shell portion covers at least part of the periphery of the core portion. Specifically, the first shell portion may partially cover the periphery of the core portion or may entirely cover the periphery of the core portion. It is favorable that the first shell portion covers the entire surface of the core portion from the viewpoint of making the exchange coupling between the core portion and the first shell portion sufficient and improving the magnetic properties.

The first shell portion is a so-called soft magnetic layer and includes a soft magnetic material such as α-Fe, a Ni—Fe alloy, and an Fe—Si—Al alloy. The α-Fe may be obtained by reducing the ε-iron oxide contained in the core portion.

The second shell portion is an oxide film as an antioxidant layer. The second shell portion contains α-iron oxide, aluminum oxide, or silicon oxide. The x-iron oxide contains, for example, at least one iron oxide of Fe$_3$O$_4$, Fe$_2$O$_3$, or FeO. In the case where the first shell portion contains α-Fe (soft magnetic material), the α-iron oxide may be obtained by oxidizing α-Fe contained in the first shell portion.

Since the ε-iron oxide particle includes the first shell portion as described above, it is possible to adjust a coercive force Hc of the entire ε-iron oxide particles (core-shell particles) to the coercive force Hc suitable for recording while maintaining the coercive force Hc of the core portion alone at a large value for achieving thermal stability. Further, since the ε-iron oxide particle includes the second shell portion as described above, it is possible to suppress deterioration of the properties of the ε-iron oxide particles due to the ε-iron oxide particles being exposed to the air and the surfaces of the particles being rusted in the process of producing the magnetic tape 1 and before the process. Therefore, it is possible to suppress deterioration of the properties of the magnetic tape 1.

The ε-iron oxide particle may include a shell portion having a single-layer structure. In this case, the shell portion has a configuration similar to that of the first shell portion. However, from the viewpoint of suppressing deterioration of the properties of the ε-iron oxide particles, it is favorable that the ε-iron oxide particle includes the shell portion having a two-layer structure, as described above.

The ε-iron oxide particles may include an additive instead of the core-shell structure described above or may include an additive while having the core-shell structure. In this case, some Fes of the ε-iron oxide particles are substituted by the additive. Also with the ε-iron oxide particles including the additive, the coercive force Hc of the entire ε-iron oxide particles can be adjusted to the coercive force Hc suitable for recording, and thus, it is possible to improve the easiness of recording. The additive is a metal element other than iron, favorably a trivalent metal element, more favorably at least one of Al, Ga, or In, and sill more favorably at least one of Al or Ga.

Specifically, the ε-iron oxide including the additive is ε-$Fe_{2-x}M_xO_3$ crystals (where M is a metal element other than iron, favorably a trivalent metal element, more favorably at least one of Al, Ga, or In, and still more favorably at least one of Al or Ga. x is, for example, 0<x<1.).

In the case where the magnetic powder includes the ε-iron oxide particles, the average particle size of the magnetic powder is favorably 10 nm or more and 20 nm or less, more favorably 10 nm or more and 18 nm or less, still more favorably 10 nm or more and 16 nm or less, particularly favorably 10 nm or more and 15 nm or less, and most favorably 10 nm or more and 14 nm or less. In the magnetic tape 1, a region having a size of ½ of the recording wavelength is an actual magnetized region. For this reason, by setting the average particle size of the magnetic powder to half or less of the shortest recording wavelength, it is possible to achieve more excellent electromagnetic conversion characteristics (e.g., SNR). Therefore, when the average particle size of the magnetic powder is 20 nm or less, it is possible to achieve more excellent electromagnetic conversion characteristics (e.g., SNR) in the magnetic tape 1 having high recording density (e.g., the magnetic tape 1 configured to be capable of recording a signal at the shortest recording wavelength of 40 nm or less). Meanwhile, when the average particle size of the magnetic powder is 10 nm or more, the dispersibility of the magnetic powder is further improved and it is possible to achieve more excellent electromagnetic conversion characteristics (e.g., SNR).

In the case where the magnetic powder includes the ε-iron oxide particles, the average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic powder is within a range of 1.0 or more and 3.0 or less, it is possible to suppress agglomeration of the magnetic powder. Further, the resistance applied to the magnetic powder when perpendicularly orienting the magnetic powder in the process of forming the magnetic layer 4 can be suppressed. Therefore, it is possible to improve the perpendicular orientation property of the magnetic powder.

In the case where the magnetic powder includes powder of the ε-iron oxide particles, the average particle size and the average aspect ratio of the magnetic powder are obtained as follows. First, the magnetic tape 1 to be measured is processed by an FIB (Focused Ion Beam) method or the like to obtain a slice. In the case of using an FIB method, a carbon layer and a tungsten layer are formed as protective layers as pre-processing for observing a TEM image of a cross section described below. The carbon layer is formed on each of the surfaces of the magnetic tape 1 on the side of the magnetic layer 4 and on the side of the magnetic layer 5 by a vapor deposition method and the tungsten layer is further formed on the surface on the side of the magnetic layer 4 by a vapor deposition method or a sputtering method. The slicing is performed along a length direction (longitudinal direction) of the magnetic tape 1. That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section described above of the obtained slice sample such that the entire magnetic layer 43 is included with respect to the thickness direction of the magnetic layer 4 at the acceleration voltage: 200 kV and the total magnification: 500,000 times to take a TEM photograph. Next, 50 particles, which have the shape that can be clearly checked, are selected from the taken TEM photograph, and a long-axis length DL and a short-axis length DS of each particle are measured. Here, the long-axis length DL means the maximum one (so-called maximum Feret diameter) of distances between two parallel lines drawn at any angle so as to be in contact with the outline of each particle. Meanwhile, the short-axis length DS means the maximum one of particle lengths in a direction orthogonal to a long axis (DL) of the particle. Subsequently, the measured long-axis lengths DL of the 50 particles are simply averaged (arithmetically averaged) to obtain an average major axis length $DL_{ave}$. The average major axis length $DL_{ave}$ obtained in this way is used as the average particle size of the magnetic powder. Further, the measured short-axis lengths DS of the 50 particles are simply averaged (arithmetically averaged) to obtain an average short-axis length $DS_{ave}$. Then, an average aspect ratio ($DL_{ave}/DS_{ave}$) of the particles is obtained on the basis of the average major axis length $DL_{ave}$ and the average short-axis length $DS_{ave}$.

In the case where the magnetic powder includes the ε-iron oxide particles, the average particle volume of the magnetic powder is favorably 500 $nm^3$ or more and 4000 $nm^3$ or less, more favorably 500 $nm^3$ or more and 3000 $nm^3$ or less, still more favorably 500 $nm^3$ or more and 2000 $nm^3$ or less, particularly favorably 600 $nm^3$ or more and 1600 $nm^3$ or less, and most favorably 600 $nm^3$ or more and 1300 $nm^3$ or less. Since noise of the magnetic tape 1 is generally inversely proportional to the square root of the number of particles (i.e., proportional to the square root of the particle volume), it is possible to achieve more excellent electromagnetic conversion characteristics (e.g., SNR) by making the particle volume smaller. Therefore, when the average particle volume of the magnetic powder is 4000 $nm^3$ or less, it is possible to achieve more excellent electromagnetic conversion characteristics (e.g., SNR) as in the case where the average particle size of the magnetic powder is 20 nm or less. Meanwhile, when the particle volume of the magnetic powder is 500 $nm^3$ or more, an effect similar to that in the case where the average particle size of the magnetic powder is 10 nm or more can be achieved.

In the case where the ε-iron oxide particles each have a spherical shape, the average particle volume of the magnetic powder is obtained as follows. First, the average major axis length $DL_{ave}$ is obtained in a way similar to the method of calculating the average particle size of the magnetic powder described above. Next, the average volume V of the magnetic powder is obtained in accordance with the following formula.

$$V = (\pi/6) \times DL_{ave}^3$$

In the case where the α-iron oxide particles each have a cubic shape, the average volume of the magnetic powder can be obtained as follows. The magnetic tape 1 is processed by an FIB (Focused Ion Beam) method or the like to obtain a slice. In the case of using an FIB method, a carbon film and a tungsten thin film are formed as protective films as pre-processing for observing a TEM image of a cross section described below. The carbon film is formed on each of the surfaces of the magnetic tape 1 on the side of the magnetic layer 4 and on the side of the magnetic layer 5 by a vapor deposition method and the tungsten thin film is further formed on the surface on the side of the magnetic layer 4 by a vapor deposition method or a sputtering method. The slicing is performed along a length direction (longitudinal direction) of the magnetic tape 1. That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section of the obtained slice sample such that the entire magnetic layer 43 is included with respect to the thickness direction of the magnetic layer 4 at the acceleration voltage: 200 kV and the total magnification: 500,000 times to take a TEM photograph. Note that the magnification and the acceleration voltage may be adjusted as appropriate in accordance with the type of apparatus. Next, 50 particles, which have a clear shape, are selected from the taken TEM photograph, and a length DC of a side of each particle is measured. Subsequently, the measured lengths DC of the 50 particles are simply averaged (arithmetically averaged) to obtain an average side length $DC_{ave}$. Next, an average volume $V_{ave}$ (particle volume) of the magnetic powder is obtained on the basis of the following formula by using the average side length $DC_{ave}$.

$$V_{ave}=DC_{ave}^3$$

(Cobalt Ferrite Particles)

It is favorable that the cobalt ferrite particles each have uniaxial crystal anisotropy. Since the cobalt ferrite particle has uniaxial crystal anisotropy, it is possible to make the magnetic powder preferentially crystal-oriented in the thickness direction (perpendicular direction) of the magnetic tape 1. The cobalt ferrite particle has, for example, a cubic shape. In this specification, the cubic shape includes a substantially cubic shape. The Co-containing spinel ferrite may further contain at least one of Ni, Mn, Al, Cu, or Zn in addition to Co.

The Co-containing spinel ferrite has an average composition represented by the following formula, for example.

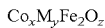

$$Co_xM_yFe_2O_z$$

(where M is, for example, at least one metal of Ni, Mn, Al, Cu, or Zn. x is a value in a range of $0.4 \leq x \leq 1.0$. y is a value in a range of $0 \leq y \leq 0.3$. However, x and y satisfy the relationship of $(x+y) \leq 1.0$. z is a value in a range of $3 \leq z \leq 4$. Some Fes may be substituted by another metal element.)

In the case where the magnetic powder includes powder of the cobalt ferrite particles, the average particle size of the magnetic powder is favorably 8 nm or more and 16 nm or less, more favorably 8 nm or more and 13 nm or less, and still more favorably 8 nm or more and 10 nm or less. When the average particle size of the magnetic powder is 16 nm or less, it is possible to achieve more excellent electromagnetic conversion characteristics (e.g., SNR) in the magnetic tape 1 having high recording density. Meanwhile, when the average particle size of the magnetic powder is 8 nm or more, the dispersibility of the magnetic powder is further improved, and it is possible to achieve more excellent electromagnetic conversion characteristics (e.g., SNR). The method of calculating the average particle size of the magnetic powder is similar to the method of calculating the average particle size of the magnetic powder in the case where the magnetic powder includes powder of the ε-iron oxide particles.

In the case where the magnetic powder includes powder of the cobalt ferrite particles, the average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic powder is within a range of 1.0 or more and 3.0 or less, it is possible to suppress agglomeration of the magnetic powder. Further, the resistance applied to the magnetic powder when perpendicularly orienting the magnetic powder in the process of forming the magnetic layer 4 can be suppressed. Therefore, it is possible to improve the perpendicular orientation property of the magnetic powder. The method of calculating the average aspect ratio of the magnetic powder is similar to the method of calculating the average aspect ratio of the magnetic powder in the case where the magnetic powder includes powder of the ε-iron oxide particles.

In the case where the magnetic powder includes powder of the cobalt ferrite particles, the average particle volume of the magnetic powder is favorably 500 nm$^3$ or more and 4000 nm$^3$ or less, more favorably 600 nm$^3$ or more and 2000 nm$^3$ or less, and still more favorably 600 nm$^3$ or more and 1000 nm$^3$ or less. When the average particle volume of the magnetic powder is 4000 nm$^3$ or less, an effect similar that in the case where the average particle size of the magnetic powder is 16 nm or less can be achieved. Meanwhile, when the average particle volume of the magnetic powder is 500 nm$^3$ or more, an effect similar to that in the case where the average particle size of the magnetic powder is 8 nm or more can be achieved. The method of calculating the average particle volume of the magnetic powder is similar to the method of calculating the average particle volume in the case where the ε-iron oxide particle has a cubic shape.

(Binder)

Examples of the binder include a thermoplastic resin, a thermosetting resin, and a reactive resin. Examples of the thermoplastic resin include vinyl chloride, vinyl acetate, a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinyl chloride-vinylidene chloride copolymer, an acrylic acid ester-acrylonitrile copolymer, an acrylic acid ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyurethane resin, a polyester resin, an amino resin, and synthetic rubber.

Examples of the thermosetting resin include a phenolic resin, an epoxy resin, a polyurethane curable resin, a urea resin, a melamine resin, an alkyd resin, a silicone resin, a polyamine resin, and a urea-formaldehyde resin.

For the purpose of improving the dispersibility of the magnetic powder, —SO$_3$M, —OSO$_3$M, —COOM, P=O (OM)$_2$ (where M represents a hydrogen atom or an alkali metal such as lithium, potassium, and sodium), a side chain amine having a terminal group represented by —NR1R2, —NR1R2R3$^+$X$^-$, a main chain amine represented by >NR1R2$^+$X$^-$ (where R1, R2, and R3 each represent a hydrogen atom or a hydrocarbon group, and X$^-$ represents a halogen element ion such as fluorine, chlorine, bromine, and iodine, an inorganic ion, or an organic ion), and a polar functional group such as —OH, —SH, —CN, and an epoxy group may be introduced into all the binders described above. The amount of the polar functional groups introduced into the binders is favorably 10-1 to 10-8 mol/g, and more favorably 10-2 to 10-6 mol/g.

(Lubricant)

The lubricant contains, for example, at least one of a fatty acid or a fatty acid ester, and favorably both a fatty acid and a fatty acid ester. Containing a lubricant in the magnetic layer 4, particularly, containing both a fatty acid and a fatty acid ester in the magnetic layer 4, contributes to improving the travelling stability of the magnetic tape 1. More particularly, when the magnetic layer 4 contains a lubricant and has a pore, favorable travelling stability can be achieved. It is conceivable that the improvement in the travelling stability can be achieved because the dynamic friction coefficient of the surface of the magnetic tape 1 on the side of the magnetic layer 4 is adjusted to the value suitable for travelling of the magnetic tape 1 by the lubricant described above.

The fatty acid may favorably be a compound represented by the following general formula (1) or (2). For example, one of the compound represented by the following general formula (1) and the compound represented by the general formula (2) may be contained as a fatty acid, or both of them may be contained.

Further, the fatty acid ester may favorably be a compound represented by the following general formula (3) or (4). For example, one of the compound represented by the following general formula (3) and the compound represented by the general formula (4) may be contained as the fatty acid ester, or both of them may be contained.

When the lubricant contains one or both of the compound represented by the general formula (1) and the compound represented by the general formula (2) and one or both of the compound represented by the general formula (3) and the compound represented by the general formula (4), it is possible to suppress an increase in dynamic friction coefficient due to repeated recording or reproduction of the magnetic tape 1.

$$CH_3(CH_2)_k COOH \quad (1)$$

(However, in the general formula (1), k is an integer selected from a range of 14 or more and 22 or less, and more favorably a range of 14 or more and 18 or less.)

$$CH_3(CH_2)_n CH=CH(CH_2)_m COOH \quad (2)$$

(However, in the general formula (2), the sum of n and m is an integer selected from a range of 12 or more and 20 or less, and more favorably a range of 14 or more and 18 or less.)

$$CH_3(CH_2)_p COO(CH_2)_q CH_3 \quad (3)$$

(However, in the general formula (3), p is an integer selected from a range of 14 or more and 22 or less, and more favorably a range of 14 or more and 18 or less, and q is an integer selected from a range of 2 or more and 5 or less, and more favorably a range of 2 or more and 4 or less.)

$$CH_3(CH_2)_r COO-(CH_2)_s CH(CH_3)_2 \quad (4)$$

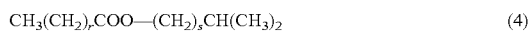

(However, in the general formula (4), r is an integer selected from a range of 14 or more and 22 or less, and s is an integer selected from a range of 1 or more and 3 or less.)

(Antistatic Agent)

Examples of the antistatic agent include carbon black, natural surfactant, nonionic surfactant, and cationic surfactant.

(Abrasive)

Examples of the abrasive include α-alumina, β-alumina, and γ-alumina having an α-transformation rate of 90% or more, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide obtained by dehydrating a raw material of magnetic iron oxide and performing annealing treatment thereon, and those obtained by performing surface treatment on them with aluminum and/or silica as necessary.

(Curing Agent)

Examples of the curing agent include a polyisocyanate. Examples of the polyisocyanate include an aromatic polyisocyanate such as an adduct of tolylene diisocyanate (TDI) and an active hydrogen compound, and an aliphatic polyisocyanate such as an adduct of hexamethylene diisocyanate (HMDI) and an active hydrogen compound. The weight average molecular weight of the polyisocyanates is desirably in a range of 100 to 3000.

(Rust Inhibitor)

Examples of the rust inhibitor include phenols, naphthols, quinones, a heterocyclic compound containing a nitrogen atom, a heterocyclic compound containing an oxygen atom, and a heterocyclic compound containing a sulfur atom.

(Non-Magnetic Reinforcing Particle)

Examples of the non-magnetic reinforcing particle include aluminum oxide (α, β, or γ alumina), chromium oxide, silicon oxide, diamond, garnet, emery, boron nitride, titanium carbide, silicon carbide, titanium carbide, and titanium oxide (rutile or anatase titanium oxide).

(Underlayer)

The non-magnetic layer 3 is for reducing the recesses and projections on the surface of the base material 2 and adjusting the recesses and projections on the surface of the magnetic layer 4. The non-magnetic layer 3 is a non-magnetic layer containing a non-magnetic powder, a binder, and a lubricant. The non-magnetic layer 3 supplies the lubricant to the surface of the magnetic layer 4. The non-magnetic layer 3 may further contain at least one additive of an antistatic agent, a curing agent, a rust inhibitor, or the like as necessary.

An average thickness $t_2$ of the non-magnetic layer 3 is favorably 0.3 μm or more and 1.2 μm or less, more favorably 0.3 μm or more and 0.9 μm or less, and 0.3 μm or more and 0.6 μm or less. Note that the average thickness $t_2$ of the non-magnetic layer 3 is obtained in a way similar to that for the average thickness $t_1$ of the magnetic layer 4. However, the magnification of the TEM image is adjusted as appropriate in accordance with the thickness of the non-magnetic layer 3. When the average thickness $t_2$ of the non-magnetic layer 3 is 1.2 μm or less, the stretchability of the magnetic tape 1 due to external force further increases, and thus, adjustment of the width of the magnetic tape 1 by tension adjustment becomes easier.

(Non-Magnetic Powder)

The non-magnetic powder includes, for example, at least one of inorganic particle powder or organic particle powder. Further, the non-magnetic powder may include carbon powder such as carbon black. Note that one type of non-magnetic powder may be used alone or two or more types of non-magnetic powder may be used in combination. The inorganic particles contain, for example, a metal, a metal oxide, a metal carbonate, a metal sulfate, a metal nitride, a metal carbide, a metal sulfide, or the like. Examples of the shape of the non-magnetic powder include, but not limited to, various shapes such as a needle shape, a spherical shape, a cubic shape, and a plate shape.

(Binder and Lubricant)

The binder and the lubricant are similar to those of the magnetic layer 4 described above.

(Additive)

The antistatic agent, the curing agent, and the rust inhibitor are similar to those of the magnetic layer 4 described above.

(Back Layer)

The magnetic layer 5 contains a binder and non-magnetic powder. The magnetic layer 5 may further contain at least one additive of a lubricant, a curing agent, an antistatic agent, or the like as necessary. The binder and the non-magnetic powder are similar to those of the non-magnetic layer 3 described above.

The average particle size of the non-magnetic powder is favorably 10 nm or more and 150 nm or less, and more favorably 15 nm or more and 110 nm or less. The average particle size of the non-magnetic powder is obtained in a way similar to that for the average particle size of the magnetic powder described above. The non-magnetic powder may include non-magnetic powder having two or more granularity distributions.

The upper limit value of the average thickness of the magnetic layer 5 is favorably 0.6 μm or less. When the upper limit value of the average thickness of the magnetic layer 5 is 0.6 μm or less, the non-magnetic layer 3 and the base material 2 can be kept thick even in the case where the average thickness of the magnetic tape 1 is 5.6 μm or less, and thus, it is possible to maintain the travelling stability of the magnetic tape 1 in the recording/reproduction apparatus. The lower limit value of the average thickness of the magnetic layer 5 is not particularly limited, but is, for example, 0.2 μm or more.

An average thickness $t_b$ of the magnetic layer 5 is obtained as follows. First, an average thickness $t_T$ of the magnetic tape 1 is measured. The measurement method of the average thickness $t_T$ is as described in the following "Average thickness of magnetic tape". Subsequently, the magnetic layer 5 of the sample is removed with a solvent such as MEK (methyl ethyl ketone) and dilute hydrochloric acid. Next, a Laser Hologage (LGH-110C) manufactured by Mitutoyo Corporation is used to measure the thickness of the sample at five or more positions, and the measured values are simply averaged (arithmetically averaged) to calculate an average value $t_B$ [μm]. After that, the average thickness $t_b$ [μm] of the magnetic layer 5 is obtained in accordance with the following formula. Note that the measurement positions are randomly selected from the sample.

$$t_b \, [\mu m] = t_T \, [\mu m] - t_B \, [\mu m]$$

The magnetic layer 5 has a surface provided with numerous protruding portions. The numerous protruding portions are for forming numerous hole portions in the surface of the magnetic layer 4 under a state in which the magnetic tape 1 has been wound in a roll shape. The numerous hole portions are formed by numerous non-magnetic particles protruding from the surface of the magnetic layer 5, for example.

(Average Thickness of Magnetic Tape)

The upper limit value of the average thickness (average total thickness) $t_T$ of the magnetic tape 1 is 5.6 μm or less, favorably 5.0 μm or less, more favorably 4.6 μm or less, and still more favorably 4.4 μm or less. When the average thickness $t_T$ of the magnetic tape 1 is 5.6 μm or less, it is possible to make the recording capacity of a single data cartridge larger than that of a general magnetic tape. The lower limit value of the average thickness $t_T$ of the magnetic tape 1 is not particularly limited, but is, for example, 3.5 μm or more.

The average thickness $t_T$ of the magnetic tape 1 is obtained as follows. First, the magnetic tape 1 having a width of ½ inch is prepared and cut into a length of 250 mm to prepare a sample. Next, a Laser Hologage (LGH-110C) manufactured by Mitutoyo Corporation is used as a measuring apparatus to measure the thickness of the sample at five or more positions, and the measured values are simply averaged (arithmetically averaged) to calculate an average value $t_T$ [μm]. Note that the measurement positions are randomly selected from the sample.

(Coercive Force Hc)

The upper limit value of a coercive force Hc2 of the magnetic layer 4 in the longitudinal direction of the magnetic tape 1 is favorably 2000 Oe or less, more favorably 1900 Oe or less, and still more favorably 1800 Oe or less. When the coercive force Hc2 of the magnetic layer 4 in the longitudinal direction is 2000 Oe or less, sufficient electromagnetic conversion characteristics can be provided even with high recording density.

The lower limit value of the coercive force Hc2 of the magnetic layer 4 measured in the longitudinal direction of the magnetic tape 1 is favorably 1000 Oe or more. When the coercive force Hc2 of the magnetic layer 4 measured in the longitudinal direction is 1000 Oe or more, it is possible to suppress demagnetization due to leakage flux from the recording head.

The coercive force Hc2 described above is obtained as follows. First, the magnetic tape 1 housed in the cartridge is unwound, the magnetic tape 1 is cut at the position of 30 m from one end thereof on the outermost periphery side, and three magnetic tapes 1 are superimposed with double sided tape such that the orientations of the magnetic tapes 1 in the longitudinal direction are the same, and then punched out with a punch of 6.39 mm to prepare a measurement sample. At this time, marking is performed with arbitrary non-magnetic ink such that the longitudinal direction (travelling direction) of the magnetic tape 1 can be recognized. Then, a vibrating sample magnetometer (VSM) is used to measure the M-H loop of the measurement sample (the entire magnetic tape 1) corresponding to the longitudinal direction (travelling direction) of the magnetic tape 1. Next, acetone, ethanol, or the like is used to wipe off the coating film (the non-magnetic layer 3, the magnetic layer 4, the magnetic layer 5, and the like) of the magnetic tape 1 cut as described above, leaving only the base material 2. Then, three obtained base materials 41 are superimposed with double sided tape, and then punched out with a punch of 06.39 mm to prepare a sample for background correction (hereinafter, referred to simply as "correction sample"). After that, the M-H loop of the correction sample (base material 2) corresponding to the perpendicular direction of the base material 2 (perpendicular direction of the magnetic tape 1) is measured using the VSM.

In the measurement of the M-H loop of the measurement sample (the entire magnetic tape 1) and the M-H loop of the correction sample (base material 2), a High Sensitivity Vibrating Sample Magnetometer "VSM-P7-15" manufactured by TOEI INDUSTRY CO., LTD. is used. The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After the M-H loop of the measurement sample (the entire magnetic tape 1) and the M-H loop of the correction sample (base material 2) are obtained, the M-H loop of the correction sample (base material 2) is subtracted from the M-H loop of the measurement sample (the entire magnetic tape 1) to perform background correction, thereby obtaining the M-H loop after background correction. A measurement/analysis program attached to the "VSM-P7-15" is used for this calculation of background correction. The coercive force Hc2 is obtained on the basis of the obtained M-H loop after background correction. Note that the measurement/analysis program attached to the "VSM-P7-15" is used for this calculation. Note that the measurement of the M-H loop described above is performed at 25° C.±2° C. and 50% RH±5% RH. Further, the "demagnetizing field correction" in measuring the M-H loop in the longitudinal direction of the magnetic tape 1 is not performed.

(Squareness Ratio)

A squareness ratio S1 of the magnetic layer 4 in the perpendicular direction (thickness direction) of the magnetic tape 1 is favorably 65% or more, more favorably 70% or more, still more favorably 75% or more, particularly favorably 80% or more, and most favorably 85% or more. When the squareness ratio S1 is 65% or more, the perpendicular orientation property of the magnetic powder is sufficiently high, and thus, it is possible to achieve more excellent electromagnetic conversion characteristics (e.g., SNR).

The squareness ratio S1 in the perpendicular direction is obtained as follows. First, the magnetic tape 1 housed in the cartridge is unwound, the magnetic tape 1 is cut at the position of 30 m from one end thereof on the outermost periphery side, and three magnetic tapes 1 are superimposed with double sided tape such that the orientations of the magnetic tapes 1 in the longitudinal direction are the same, and then punched out with a punch of φ6.39 mm to prepare a measurement sample. At this time, marking is performed with arbitrary non-magnetic ink such that the longitudinal direction (travelling direction) of the magnetic tape 1 can be recognized. Then, the M-H loop of the measurement sample (the entire magnetic tape 1) corresponding to the longitudinal direction (travelling direction) of the magnetic tape 1 is measured using a vibrating sample magnetometer (VSM). Next, acetone, ethanol, or the like is used to wipe off the coating film (the non-magnetic layer 3, the magnetic layer 4, the magnetic layer 5, and the like) of the magnetic tape 1 cut as described above, leaving only the base material 2. Then, three obtained base materials 41 are superimposed with double sided tape, and then punched out with a punch of 6.39 mm to prepare a sample for background correction (hereinafter, referred to simply as "correction sample"). After that, the M-H loop of the correction sample (base material 2) corresponding to the perpendicular direction of the base material 2 (perpendicular direction of the magnetic tape 1) is measured using the VSM.

In the measurement of the M-H loop of the measurement sample (the entire magnetic tape 1) and the M-H loop of the correction sample (base material 2), a High Sensitivity Vibrating Sample Magnetometer "VSM-P7-15" manufactured by TOEI INDUSTRY CO., LTD. is used. The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After the M-H loop of the measurement sample (the entire magnetic tape 1) and the M-H loop of the correction sample (base material 2) are obtained, the M-H loop of the correction sample (base material 2) is subtracted from the M-H loop of the measurement sample (the entire magnetic tape 1) to perform background correction, thereby obtaining the M-H loop after background correction. The measurement/analysis program attached to the "VSM-P7-15" is used for this calculation of background correction.

A saturation magnetization Ms (emu) and a residual magnetization Mr (emu) of the obtained M-H loop after background correction are substituted into the following formula to calculate the squareness ratio S1 (%). Note that the measurement of the M-H loop described above is performed at 25° C.±2° C. and 50% RH±5% RH. Further, the "demagnetizing field correction" in measuring the M-H loop in the perpendicular direction of the magnetic tape 1 is not performed. Note that the measurement/analysis program attached to the "VSM-P7-15" is used for this calculation.

$$\text{Squareness ratio } S1(\%) = (Mr/Ms) \times 100$$

A squareness ratio S2 of the magnetic layer 4 in the longitudinal direction (travelling direction) of the magnetic tape 1 is favorably 35% or less, more favorably 30% or less, still more favorably 25% or less, particularly favorably 20% or less, and most favorably 15% or less. When the squareness ratio S2 is 35% or less, the perpendicular orientation property of the magnetic powder is sufficiently high, and thus, it is possible to achieve more excellent electromagnetic conversion characteristics (e.g., SNR).

The squareness ratio S2 in the longitudinal direction is obtained in a way similar to that for the squareness ratio S1 except for measuring the M-H loop in the longitudinal direction (travelling direction) of the magnetic tape 1 and the base material 2.

(Surface Roughness $R_b$ of Back Surface)

A surface roughness $R_b$ of the back surface (surface roughness of the magnetic layer 5) is favorably $R_b \leq 6.0$ [nm]. When the surface roughness $R_b$ of the back surface is within the range described above, it is possible to achieve more excellent electromagnetic conversion characteristics.

REFERENCE SIGNS LIST

1 magnetic tape
13 servo write head
21 facing portion
22 recording surface
23 first region
24 second region
26 magnetic gap
30 notch
33 groove portion
70 dummy
100 servo pattern recording apparatus
200 evaluation apparatus

The invention claimed is:

1. A magnetic head, comprising:
a recording surface that has a first region corresponding to a position where a magnetic gap is provided in a length direction and a second region corresponding to a position where the magnetic gap is not provided in the length direction, a plurality of groove portions crossing from one end in a width direction orthogonal to the length direction to the other end in the width direction being provided in the second region, each groove portion including at least three grooves arranged in parallel, and the magnetic head is a servo write head configured to record a servo pattern on a magnetic tape with the magnetic gap.

2. The magnetic head according to claim 1, wherein
the first region and the second region include a plurality of first regions and a plurality of second regions alternately arranged in the length direction, and
the plurality of groove portions is provided in the second region sandwiched between the first regions.

3. The magnetic head according to claim 2, wherein
the recording surface further includes recessed portions that are provided in the two first regions located at both ends in the length direction and are shielded from outside air by the magnetic tape that is in contact with the recording surface.

4. The magnetic head according to claim 1, wherein
the plurality of groove portions is linearly formed along the width direction.

5. The magnetic head according to claim 1, wherein
a width dimension of each of the plurality of groove portions along the longitudinal direction is larger than a depth dimension of each of the plurality of groove portions.

6. The magnetic head according to claim 5, wherein
a width dimension of a bottom portion of each of the plurality of groove portions along the longitudinal direction is larger than a width dimension of an apex between the plurality of groove portions.

7. The magnetic head according to claim 1, wherein
the first region is formed to have a first width in the width direction, and
the second region is formed to have a second width narrower than the first width.

8. The magnetic head according to claim 7, wherein
the second region is formed by notching the recording surface to have a predetermined shape in the width direction.

9. The magnetic head according to claim 8, wherein
the predetermined shape is a circular arc.

10. A servo pattern recording apparatus, comprising:
a servo write head having a recording surface that has a first region corresponding to a position where a magnetic gap is provided in a length direction and a second region corresponding to a position where the magnetic gap is not provided in the length direction, a plurality of groove portions crossing from one end in a width direction orthogonal to the length direction to the other end in the width direction being provided in the second region, each groove portion including at least three grooves arranged in parallel, and configured to record a servo pattern on a magnetic tape with the magnetic gap.

11. A method of producing a magnetic tape, comprising:
causing, on a recording surface of a servo write head that has a first region corresponding to a position where a magnetic gap is provided in a length direction and a second region corresponding to a position where the magnetic gap is not provided in the length direction, a plurality of groove portions crossing from one end in a width direction orthogonal to the length direction to the other end in the width direction being provided in the second region, each groove portion including at least three grooves arranged in parallel, a magnetic tape to travel in the width direction; and
recording a servo pattern on the magnetic tape with the magnetic gap while causing the magnetic tape to be in contact with the first region and at least part of the magnetic tape to float from the second region.

* * * * *